(12) United States Patent
Liu et al.

(10) Patent No.: US 10,708,583 B2
(45) Date of Patent: ***Jul. 7, 2020

(54) BIDIRECTIONAL WEIGHTED INTRA PREDICTION

(71) Applicant: Futurewei Technologies, Inc., Plano, TX (US)

(72) Inventors: Shan Liu, San Jose, CA (US); Jiali Fu, Shenzhen (CN); Shan Gao, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/053,204

(22) Filed: Aug. 2, 2018

(65) Prior Publication Data

US 2019/0089952 A1 Mar. 21, 2019

Related U.S. Application Data

(60) Provisional application No. 62/560,560, filed on Sep. 19, 2017.

(51) Int. Cl.
*H04N 19/11* (2014.01)
*H04N 19/46* (2014.01)
(Continued)

(52) U.S. Cl.
CPC ........... *H04N 19/11* (2014.11); *H04N 19/176* (2014.11); *H04N 19/46* (2014.11); *H04N 19/70* (2014.11)

(58) Field of Classification Search
None
See application file for complete search history.

(56) References Cited

U.S. PATENT DOCUMENTS

| 8,526,495 B2 | 9/2013 | Liu et al. |
| 9,049,452 B2 | 6/2015 | Liu et al. |

(Continued)

FOREIGN PATENT DOCUMENTS

| WO | 2013000435 A1 | 1/2013 |
| WO | 2013070629 A1 | 5/2013 |

OTHER PUBLICATIONS

Ye et al., "Improved H.264 Intra Coding Based on Bi-Directional Intra Prediction, Directional Transform, and Adaptive Coefficient Scanning," IEEE, 2008.*

(Continued)

*Primary Examiner* — Michael J Hess
(74) *Attorney, Agent, or Firm* — Conley Rose, P.C.

(57) ABSTRACT

A method of coding implemented by a decoding device. The method includes receiving a bitstream from an encoding device, parsing the bitstream to determine whether a directional prediction mode or a non-directional prediction mode is signaled, using non-directional intra prediction to generate an image when the non-directional prediction mode is signaled, parsing a distance-weighted directional intra prediction (DWDIP) flag from the bitstream when the directional prediction mode is signaled to determine whether the DWDIP flag has a first value or a second value, using distance-weighted directional intra prediction to generate the image when the DWDIP flag has the first value, using directional intra prediction to generate the image when the DWDIP flag has the second value, and displaying, on a display of an electronic device, the image generated.

20 Claims, 11 Drawing Sheets

(51) Int. Cl.
*H04N 19/70* (2014.01)
*H04N 19/176* (2014.01)

(56) References Cited

U.S. PATENT DOCUMENTS

| | | | |
|---|---|---|---|
| 9,363,511 | B2 | 6/2016 | Zhang et al. |
| 9,510,012 | B2 | 11/2016 | Liu et al. |
| 9,769,472 | B2 | 9/2017 | Liu et al. |
| 9,788,019 | B2 | 10/2017 | Liu et al. |
| 9,813,726 | B2 | 11/2017 | Liu et al. |
| 2014/0003518 | A1 | 1/2014 | Bang et al. |
| 2014/0086323 | A1 | 3/2014 | Chuang et al. |
| 2014/0219336 | A1 | 8/2014 | Jeon et al. |
| 2014/0269914 | A1* | 9/2014 | Oh .................. H04N 19/103 375/240.12 |
| 2015/0172719 | A1 | 6/2015 | Guo et al. |
| 2015/0365692 | A1 | 12/2015 | Liu et al. |
| 2016/0142706 | A1 | 5/2016 | Chuang et al. |
| 2017/0251213 | A1* | 8/2017 | Ye .................. H04N 19/513 |
| 2017/0272745 | A1 | 9/2017 | Liu et al. |
| 2017/0353730 | A1 | 12/2017 | Liu et al. |
| 2017/0374369 | A1 | 12/2017 | Chuang et al. |
| 2018/0288425 | A1* | 10/2018 | Panusopone ........ H04N 19/147 |
| 2019/0238837 | A1* | 8/2019 | Filippov ............. H04N 19/577 |
| 2019/0373281 | A1* | 12/2019 | Wang .................. H04N 19/105 |

OTHER PUBLICATIONS

Yu et al., "Distance-based Weighted Prediction for H.264 Intra Coding," IEEE 2008.*
Po et al., "Distance-based Weighted Prediction for Adaptive Intra Mode Bit Skip in H.264/AVC," Proceedings of 2010 IEEE 17th International Conference on Image Processing, Sep. 2010.*
Foreign Communication From a Counterpart Application, PCT Application No. PCT/CN2018/106366, English Translation of International Search Report dated Dec. 21, 2018, 5 pages.
Foreign Communication From a Counterpart Application, PCT Application No. PCT/CN2018/106366, English Translation of Written Opinion dated Dec. 21, 2018, 4 pages.
"Series H: Audiovisual and Multimedia Systems, Infrastructure of audiovisual services—Coding of moving video, High efficiency video coding," ITU-T, H.265, Dec. 2016, 664 pages.
Liu, S., et al., "Joint Temporal-Spatial Bit Allocation for Video Coding With Dependency," IEEE Transactions on Circuits and Systems for Video Technology, vol. 15, No. 1, Jan. 2005, pp. 15-26.
Liu, S., et al., "Hybrid global-local motion compensated frame interpolation for low bit rate video coding," J. Vis. Commun. Image R., vol. 14, 2003, pp. 61-79.
Liu, S., et al., "Global/Local Motion-Compensated Frame Interpolation for Low Bitrate Video," Image and Video Communications and Processing, vol. 3974, 2000, 12 pages.
Liu, S., et al., "Non-linear Motion-compensated Interpolation for Low Bit Rate Video," Applications of Digital Image Processing XXIII, vol. 4115, 2000, 11 pages.
Liu, S., et al., "MCI-embedded Motion Compensated Prediction for Quality Enhancement of Frame Interpolation," Multimedia Systems and Applications III, vol. 4209, Mar. 2001, 11 pages.
Liu, S., et al., "Joint Temporal-Spatial Rate Control with Approximating Rate-Distortion Models," Conference on Visual Communications and Image Processing, Jan. 20-25, 2002, 10 pages.

Liu, S., et al., "Complexity Reduction of Joint Temporal-Spatial Bit Allocation Using R-D Models for Video Streaming," IEEE International Conference on Image Processing, Sep. 22-25, 2002, pp. 729-732.
Liu, S., et al., "Efficient MPEG-2 to MPEG-4 Video Transcoding," Conference on Image and Video Communications and Processing, Jan. 20-24, 2003, pp. 186-195.
Lou, J., et al., "Complexity and memory efficient GOP structures supporting VCR functionalities in H. 264/AVC," IEEE International Symposium on Circuits and Systems, 2008, pp. 636-639.
Lou, J. et al., "Trick-Play Optimization for H.264 Video Decoding," Journal of Information Hiding and Multimedia Signal Processing, TR2010-076, Sep. 2010, 15 pages.
Liu, S., et al., "Joint Temporal-Spatial Rate Control for Adaptive Video Transcoding," IEEE International Conference on Multimedia and Expo, Jul. 6-9, 2003, 4 pages.
Zhang, X., et al., "Intra Mode Coding in HEVC Standard," Visual Communications and Image Processing, Jan. 2012, 6 pages.
Liu, S., et al., "Rectangular Partitioning for Intra Prediction in HEVC," Visual Communications and Image Processing, Jan. 2012, 6 pages.
Lai, P., et al., "Combined Temporal and Inter-layer Prediction for Scalable Video Coding using HEVC," Picture Coding Symposium, 2013, pp. 117-120.
Liu, S., et al., "Remove Partition Size NxN," JCTVC-D432, Jan. 20-28, 2011, 7 pages.
Liu, S., et al., "Evaluations and suggestions for TU representation," JCTVC-E083, WG11 No. m19597, Mar. 16-23, 2011, 8 pages.
Zhang, X., et al., "Method for deriving Chroma QP from Luma QP," JCTVC-F277, Jul. 14-22, 2011, 6 pages.
Liu, S., et al., "Rectangular (2NxN and Nx2N) Intra Prediction," JCTVC-G135, WG11 No. 21687, Nov. 21-30, 2011, 6 pages.
Zhang, X., et al., "Method and syntax for quantization matrices representation," JCTVC-G152, Nov. 21-30, 2011, 8 pages.
Liu, S., et al., "Support of ChromaQPOffset in HEVC," JCTVC-G509r1, Nov. 21-30, 2011, 8 pages.
Oudin, S., et al., "Harmonization of the prediction and partitioning mode binarization of P and B slices," JCTVC-G1042, Nov. 21-30, 2011, 4 pages.
Cao, X., et al., "AHG16 Unification of SDIP and NSQT," JCTVC-H0347, Feb. 1-10, 2012, 9 pages.
Zhang, X., et al., "Non-CE6: Intra mode coding with fixed length binarization," JCTVC-H0435, WG11 No. m23311, Feb. 1-10, 2012, 5 pages.
Kim, J., et al., "nonTE5: Assigning intra prediction mode to inter layer intra predicted blocks in enhance layer," JCTVC-L0239, Jan. 14-23, 2013, 5 pages.
Lai, P., et al., "SCE3.4 Generalized Combined Prediction," JCTVC-M0221, Apr. 18-26, 2013, 9 pages.
Lai, P., et al., "Non-SCE3.4: Simplified Generalized Combined Prediction," JCTVC-M0222, Apr. 2013, 10 pages.
Lai, P., et al., "Non-SCE3.4: Simplified Generalized Combined Prediction," JCTVC-M0222_r1, Apr. 18-26, 2013, 9 pages.
Seregin, V., et al., "Uni-prediction for combined inter mode," JCTVC-M0445, Apr. 18-26, 2013, 11 pages.
Xu, X., et al., "On unification of intra block copy and inter-picture motion compensation," JCTVC-Q0132, Jan. 9-17, 2014, 14 pages.
Xu, X., et al., "Non-CE2: Intra BC merge mode with default candidates," JCTVC-50123, Oct. 17-24, 2014, 7 pages.
Xu, X., et al., "CE2 Test 12: Intra BC merge mode with default candidates," JCTVC-T0073, Feb. 10-18, 2015, 6 pages.

* cited by examiner

EXAMPLE OF INTRA PREDICTION IN 4x4 BLOCKS, WITH NOTATION FOR UNFILTERED AND FILTERED REFERENCE SAMPLES

BIDIRECTIONAL WEIGHTED INTRA PREDICTION

CROSS-REFERENCE TO RELATED APPLICATIONS

This patent application claims the benefit of U.S. Provisional Patent Application No. 62/560,560, filed Sep. 19, 2017, by Shan Liu, et al., and titled "Bidirectional Weighted Intra Prediction," the teaching and disclosure of which is hereby incorporated in its entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method of coding implemented by a decoding device. The method includes receiving a bitstream from an encoding device, parsing the bitstream to determine whether a directional prediction mode or a non-directional prediction mode is signaled, using non-directional intra prediction to generate an image when the non-directional prediction mode is signaled, parsing a distance-weighted directional intra prediction (DWDIP) flag from the bitstream when the directional prediction mode is signaled to determine whether the DWDIP flag has a first value or a second value, using distance-weighted directional intra prediction to generate the image when the DWDIP flag has the first value, using directional intra prediction to generate the image when the DWDIP flag has the second value, and displaying, on a display of an electronic device, the image generated.

Optionally, in any of the preceding aspects, another implementation of the aspect provides that the non-directional intra prediction comprises direct current (DC) intra prediction or planar intra prediction. Optionally, in any of the preceding aspects, another implementation of the aspect provides that the DWDIP flag is parsed only after the bitstream is parsed to determine whether the directional prediction mode or the non-directional prediction mode is signaled. Optionally, in any of the preceding aspects, another implementation of the aspect provides that the first value is 1 to indicate that a DWDIP mode is set to ON. Optionally, in any of the preceding aspects, another implementation of the aspect provides that the first value is 0 to indicate a DWDIP mode is set to OFF. Optionally, in any of the preceding aspects, another implementation of the aspect provides that the DWDIP flag is a dwdip_enable_flag. Optionally, in any of the preceding aspects, another implementation of the aspect provides that the dwdip_enable_flag being set to 1 indicates that the DWDIP is enabled for a luma component in a current coding unit. Optionally, in any of the preceding aspects, another implementation of the aspect provides that the dwdip_enable_flag being set to 0 indicates that the DWDIP is disabled for a luma component in a current coding unit.

In an embodiment, the disclosure includes a method of coding implemented by a decoding device. The method includes receiving a bitstream from an encoding device, parsing a distance-weighted directional intra prediction (DWDIP) flag from the bitstream to determine whether the DWDIP flag has a first value or a second value, parsing only directional intra prediction modes until a directional intra prediction mode is found when the DWDIP has the first value, generating an image using distance-weighted directional intra prediction based on the directional intra prediction mode determined, parsing intra prediction modes until an intra prediction mode is found when the DWDIP has the second value, generating the image using intra prediction based on the intra prediction mode determined, and displaying, on a display of an electronic device, the image generated.

Optionally, in any of the preceding aspects, another implementation of the aspect provides that parsing only the directional intra prediction modes comprises parsing a most probable mode (MPM) list; and parsing remaining directional intra prediction modes when the MPM list does not contain the directional intra prediction mode that was determined. Optionally, in any of the preceding aspects, another implementation of the aspect provides that the intra prediction modes include both directional and non-directional intra prediction modes. Optionally, in any of the preceding aspects, another implementation of the aspect provides that the first value is 1 to indicate that a DWDIP mode is set to ON, and the first value is 0 to indicate the DWDIP mode is set to OFF. Optionally, in any of the preceding aspects, another implementation of the aspect provides that the DWDIP flag is a dwdip_enable_flag. Optionally, in any of the preceding aspects, another implementation of the aspect provides that the dwdip_enable_flag being set to 1 indicates that the DWDIP is enabled for a luma component in a current coding unit. Optionally, in any of the preceding aspects, another implementation of the aspect provides that the dwdip_enable_flag being set to 0 indicates that the DWDIP is disabled for a luma component in a current coding unit.

In an embodiment, the disclosure includes a coding device. The coding device includes a receiver configured to receive a bitstream from an encoding device. The coding device includes a processor coupled to the receiver. The processor is configured to parse a distance-weighted directional intra prediction (DWDIP) flag from the bitstream to determine whether the DWDIP flag has a first value or a second value, parse a most probable mode (MPM) list for an intra prediction mode when the DWDIP has the first value, where the MPM list contains only directional intra prediction modes, parse one or more remaining intra prediction modes for the intra prediction mode when the MPM list did not contain the intra prediction mode and the DWDIP has the first value, where any non-directional intra prediction modes within the remaining intra prediction modes are configured to be parsed last, generate an image using distance-weighted directional intra prediction based on the intra prediction mode when the DWDIP has the first value, parse one or more of the directional intra prediction modes and the non-directional intra prediction modes for the intra prediction mode when the DWDIP has the second value, and generate the image using intra prediction based on the intra prediction mode when the DWDIP has the second value. The coding device also includes a display coupled to the processor. The display is configured to display the image generated.

Optionally, in any of the preceding aspects, another implementation of the aspect provides that the non-directional intra prediction modes comprise a direct current (DC) intra prediction mode and a planar intra prediction mode. Optionally, in any of the preceding aspects, another implementation of the aspect provides that the DWDIP flag is a dwdip_enable_flag.

Optionally, in any of the preceding aspects, another implementation of the aspect provides that the dwdip_enable_flag being set to 1 indicates that the DWDIP is enabled for a luma component in a current coding unit. Optionally, in any of the preceding aspects, another implementation of the aspect provides that the dwdip_enable_flag being set to 0 indicates that the DWDIP is disabled for a luma component in a current coding unit.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
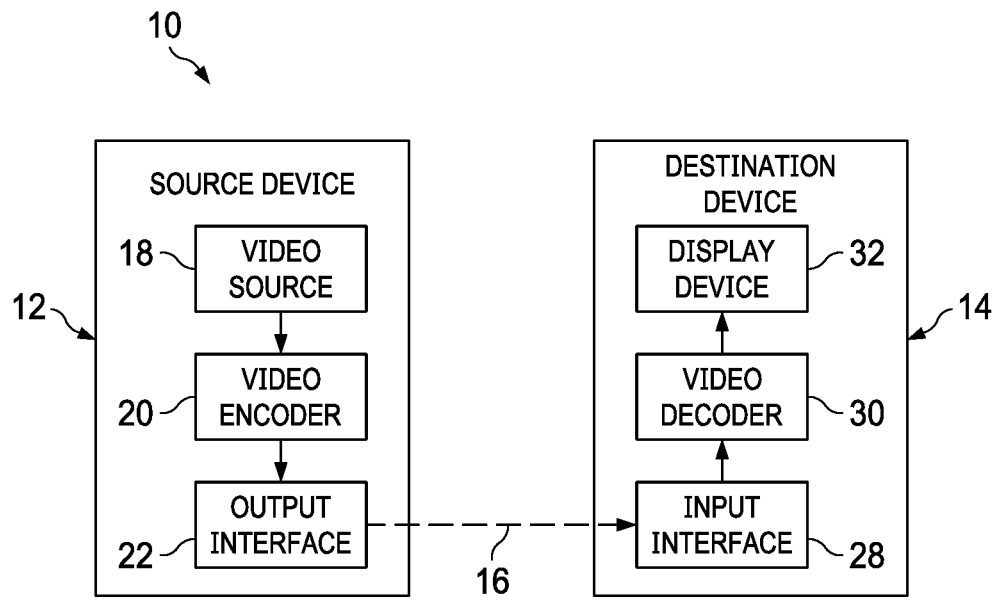
FIG. 1 is a block diagram illustrating an example coding system that may utilize bi-lateral prediction techniques.

FIG. 1 is a block diagram illustrating an example coding system 10 that may utilize bidirectional prediction techniques. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface 28. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 and/or the video decoder 30 of the destination device 14 may be configured to apply the techniques for bidirectional prediction. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for bidirectional prediction may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Motion Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
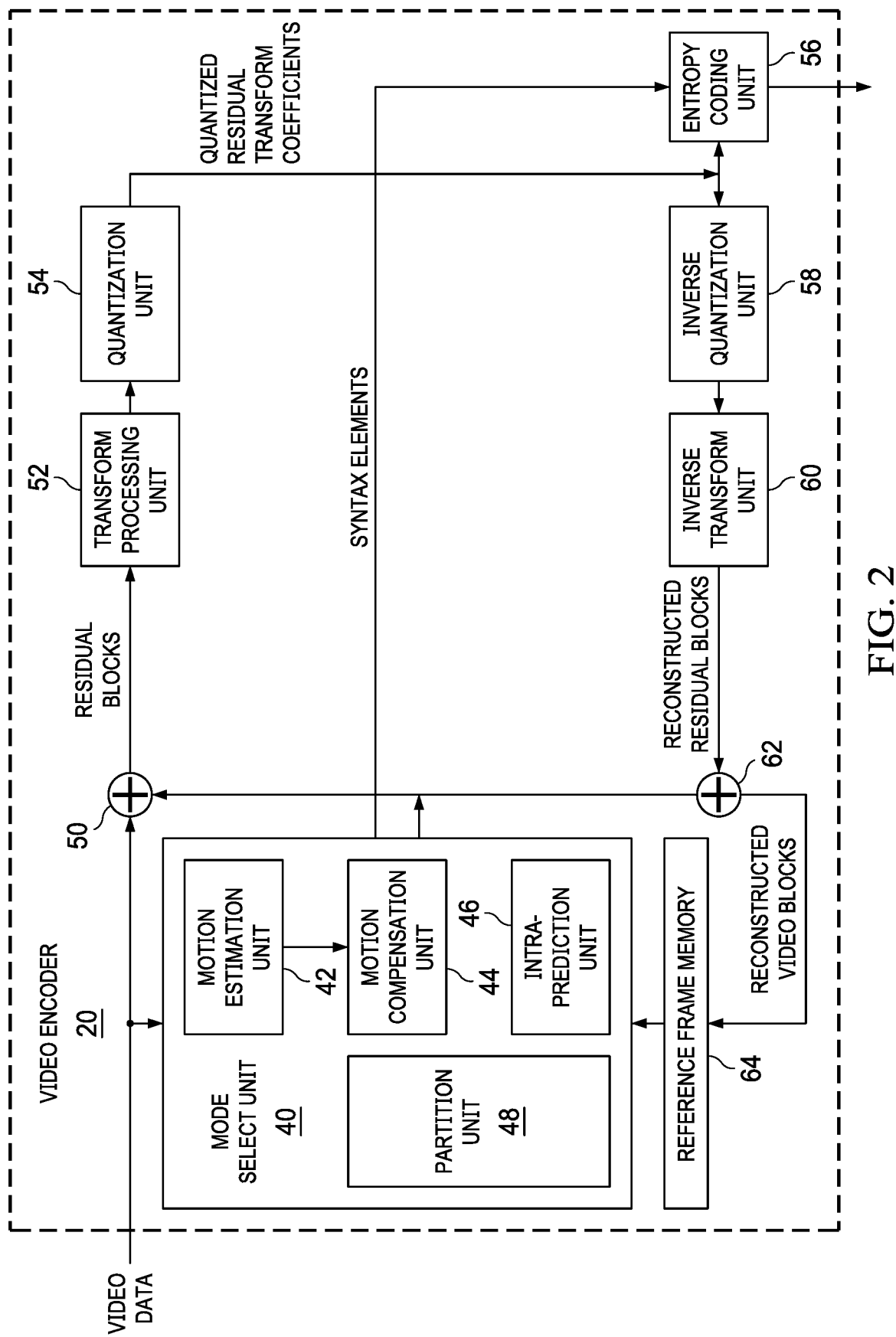
FIG. 2 is a block diagram illustrating an example video encoder that may implement bi-lateral prediction techniques.

FIG. 2 is a block diagram illustrating an example of video encoder 20 that may implement bidirectional prediction techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in-loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quadtree data structure indicative of partitioning of a LCU into sub-CUs. Leaf-node CUs of the quadtree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
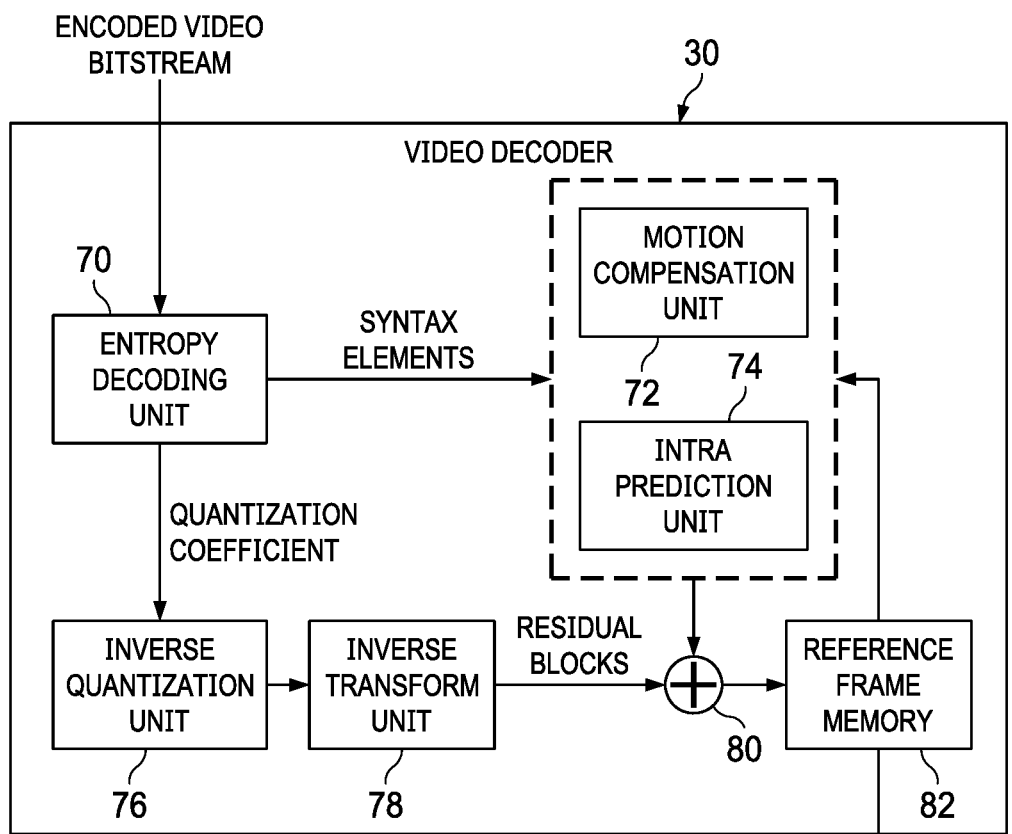
FIG. 3 is a block diagram illustrating an example of a video decoder that may implement bi-lateral prediction techniques.

FIG. 3 is a block diagram illustrating an example of video decoder 30 that may implement bidirectional prediction techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra-prediction mode and data from previously decoded blocks of the current frame or picture. When the video frame is coded as an inter-coded (i.e., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

As will be appreciated by those in the art, the coding system 10 of FIG. 1 is suitable for implementing various video coding or compression techniques. Some video compression techniques, such as inter-prediction, intra-prediction, and loop filters, have demonstrated to be effective. Therefore, the video compression techniques have been adopted into various video coding standards, such as H.264/AVC and H.265/HEVC.

Digital video communication and storage applications are implemented by a wide range of digital devices, e.g., digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as H.264/AVC and H.265/HEVC, provide a good tradeoff between these parameters. For that reason, support of video coding standards is a mandatory requirement for almost any video compression application.

Intra prediction can be used when there is no available reference picture, or when inter predication coding is not used for the current block or picture. The reference samples of intra prediction are usually derived from previously coded (or reconstructed) neighboring blocks in the same picture. For example, both in H.264/AVC and H.265/HEVC, the boundary samples of adjacent blocks are used as reference for intra prediction. In order to cover different texture or structural character, there are many different intra prediction modes. In each mode, a different prediction signal derivation method is used. For example, H.265/HEVC supports a total of 35 intra prediction modes.

Figure 4:
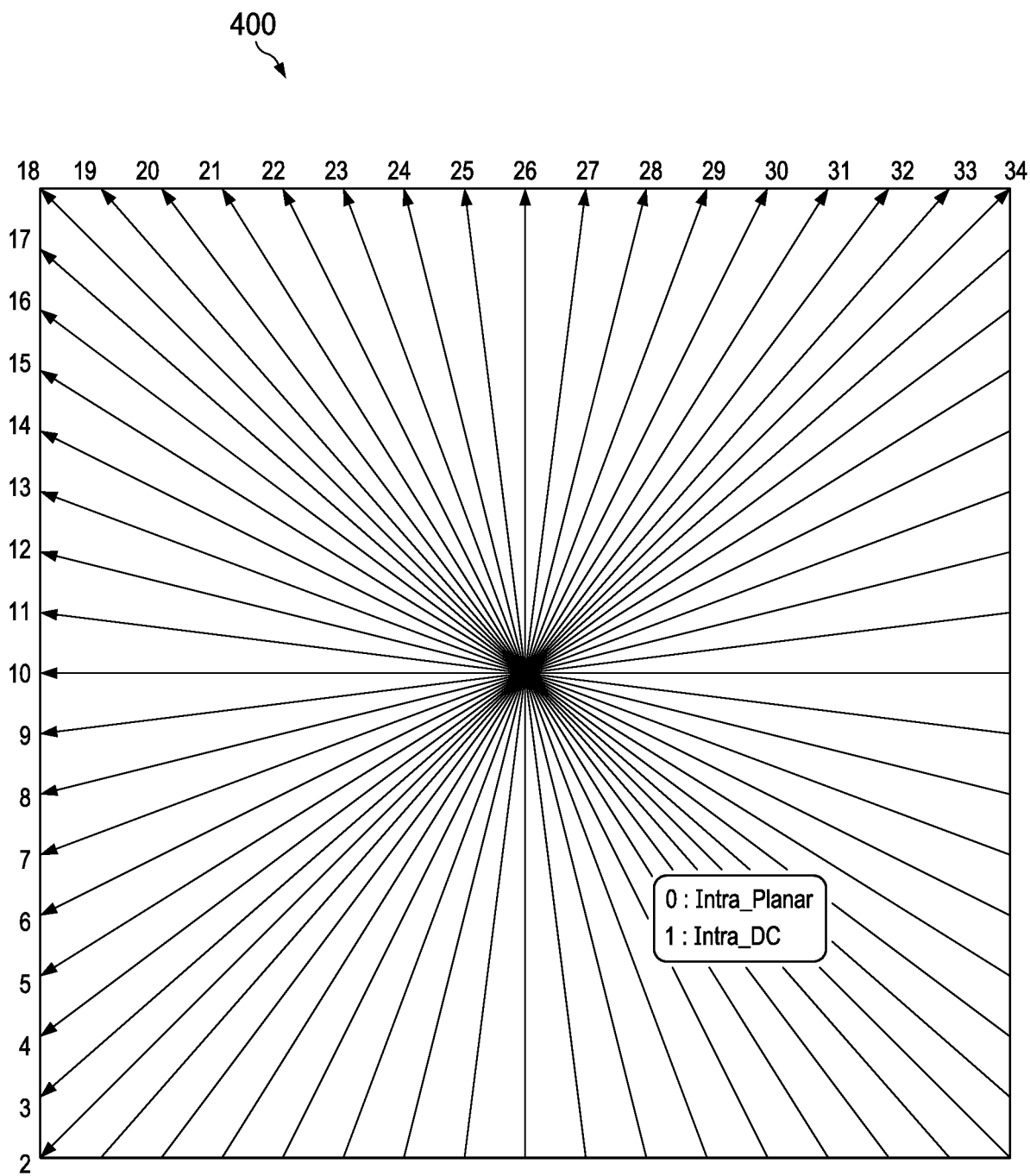
FIG. 4 is a mapping between the intra prediction direction and the intra prediction mode number.

A regular intra prediction algorithm description of H.265/HEVC is provided. The decoded boundary samples of adjacent blocks are used as reference for spatial prediction in regions where inter prediction is not performed. The encoder selects the best luma intra prediction mode of each block from 35 options: 33 directional prediction modes, a direct current (DC) mode, and a planar mode. A mapping 400 between the intra prediction direction and the intra prediction mode number is specified in FIG. 4. To accommodate the number of directional intra modes, an intra mode coding method with the three Most Probable Modes (MPMs) is often used.

Figure 5:
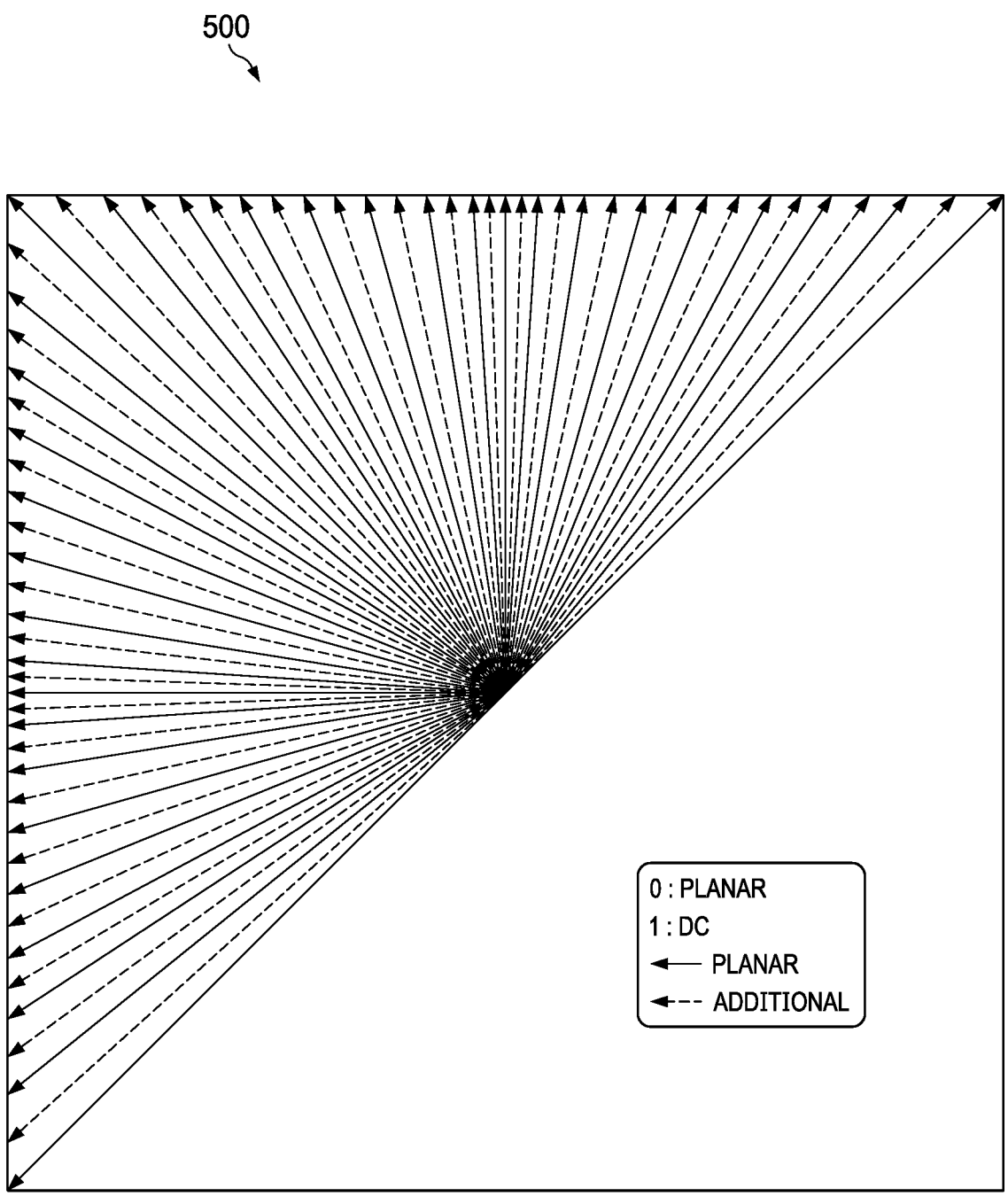
FIG. 5 is a mapping between the intra prediction direction and the intra prediction mode number with additional direction modes.

Regular intra mode coding with 67 intra prediction modes in Joint Exploration Model (JEM) is discussed. To capture the arbitrary edge directions presented in natural video, the number of directional intra modes is extended from 33, as used in HEVC, to 65. A mapping 500 with the additional direction modes is illustrated in FIG. 5. As shown, the planar and DC modes remain the same in FIG. 5. In addition, the additional and planar/DC modes alternate in the mapping 500. These denser directional intra prediction modes apply for all block sizes and for both luma and chroma intra predictions.

To accommodate the increased number of directional intra modes, an intra mode coding method with 6 MPMs is used. Two major technical aspects are involved: 1) the derivation of the 6 MPMs, and 2) entropy coding of 6 MPMs and non-MPM modes.

Figure 6:
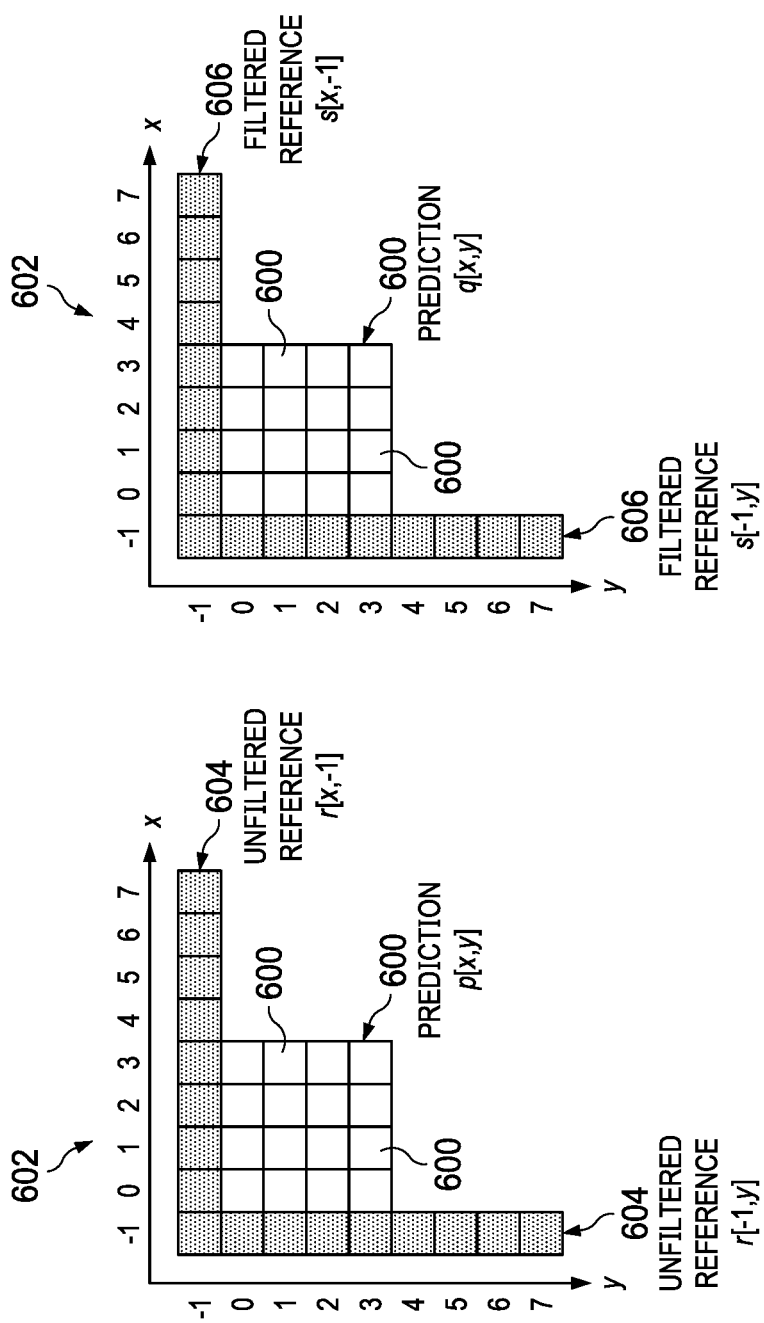
FIG. 6 illustrates different intra prediction techniques to predict pixels in a block using unfiltered and filtered references.

The first bidirectional weighted intra prediction method is for position dependent intra prediction combination (PDPC). PDPC is an intra prediction mode which invokes a combination of HEVC intra prediction techniques to predict pixels 600 in a block 602 as shown in FIG. 6. Indeed, PDPC uses un-filtered reference boundary samples 604 and filtered reference boundary samples 606.

The notation used to define PDPC is provided in FIG. 6. r and s represent the boundary samples with unfiltered and filtered references, respectively. The prediction q[x, y] is the HEVC style intra prediction based on filtered reference boundary samples 606, which are designated in the formula below as s. x and y are the horizontal and vertical distance from the block boundary.

The prediction p[x, y] combines weighted values of boundary elements with q[x, y] as follows:

$$p[x,y] = \{(c_1^{(v)} >> \lfloor y/d_y \rfloor)r[x,-1] - (c_2^{(v)} >> \lfloor y/d_y \rfloor)r[-1,-1] + (c_1^{(h)} >> \lfloor x/d_x \rfloor)r[-1,y] - (c_2^{(h)} >> \lfloor x/d_x \rfloor)r[-1,-1] + b[x,y]q[x,y] + 64\} >> 7 \quad (1)$$

where $c_1^v$, $c_2^v$, $c_1^h$, $c_2^h$ are stored prediction parameters, $d_x=1$ for blocks with width smaller than or equal to 16 and $d_x=2$ for blocks with width larger than 16, $d_y=1$ for blocks with height smaller than or equal to 16 and $d_y=2$ for blocks with height larger than 16. b[x, y] is a normalization factor derived as follows:

$$b[x,y] = 128 - (c_1^{(v)} >> \lfloor y/d_y \rfloor) + (c_2^{(v)} >> \lfloor y/d_y \rfloor) - (c_1^{(h)} >> \lfloor x/d_x \rfloor) + (c_2^{(h)} >> \lfloor x/d_x \rfloor) \quad (2)$$

One of five pre-defined 7-tap low pass filters is used to smooth the boundary samples. The selection of smoothing filter is based on the block size and the intra prediction mode. Defining $h_k$ as the impulse response of a filter k, and an additional stored parameter a, the filtered reference is computed as follows:

$$s = ar + (1-a)(h_k * r) \quad (3)$$

where "*" represents convolution.

One set of prediction parameters ($c_1^v$, $c_2^v$, $c_1^h$, $c_2^h$, a and filter index k) is defined per intra prediction mode (neighbouring prediction directions are grouped) and block size. A CU-level PDPC flag is signaled to indicate whether PDPC is applied or not, such that the value 0 indicates that the existing HEVC style intra prediction is used, and the value 1 indicates that PDPC is applied. It should be noted that when the PDPC flag value is equal to 0, an adaptive reference sample smoothing method is applied.

At the encoder side, the PDPC flag for an intra-coded CU is determined at the CU level. When intra mode RD cost check is needed for a CU, one additional CU level RD check is added to select the PDPC flag between the value of 0 and 1 for an intra-coded CU.

The second bidirectional weighted intra prediction method is for distance-weighted directional intra-prediction (DWDIP).

Embodiments that relate to the DWDIP technique that allows intra-predictors to be generated are presented.

At the PU-level, the flag idw_dir_mode_PU_flag is used to signal whether the DWDIP processing is enabled (idw_dir_mode_PU_flag==1) for directional intra-prediction modes or not (idw_dir_mode_PU_flag==0). Next, the RD-cost is calculated for different variants of residual quadtree (RQT) (e.g., partitioning on the TU level) if DWDIP is on and off. It is worth noting that by definition, DWDIP is only applicable to directional intra-prediction modes, i.e., $I_{IPM}>1$. Finally, the value of the flag idw_dir_mode_PU_flag that provides the minimal RD-cost is selected. For 4×4 TUs, DWDIP is disabled for any value of the flag idw_dir_mode_PU_flag. The decoder uses the same constraints and syntax elements to be parsed and, therefore, the decoding process is based on the same concept as the encoder.

Figure 7:
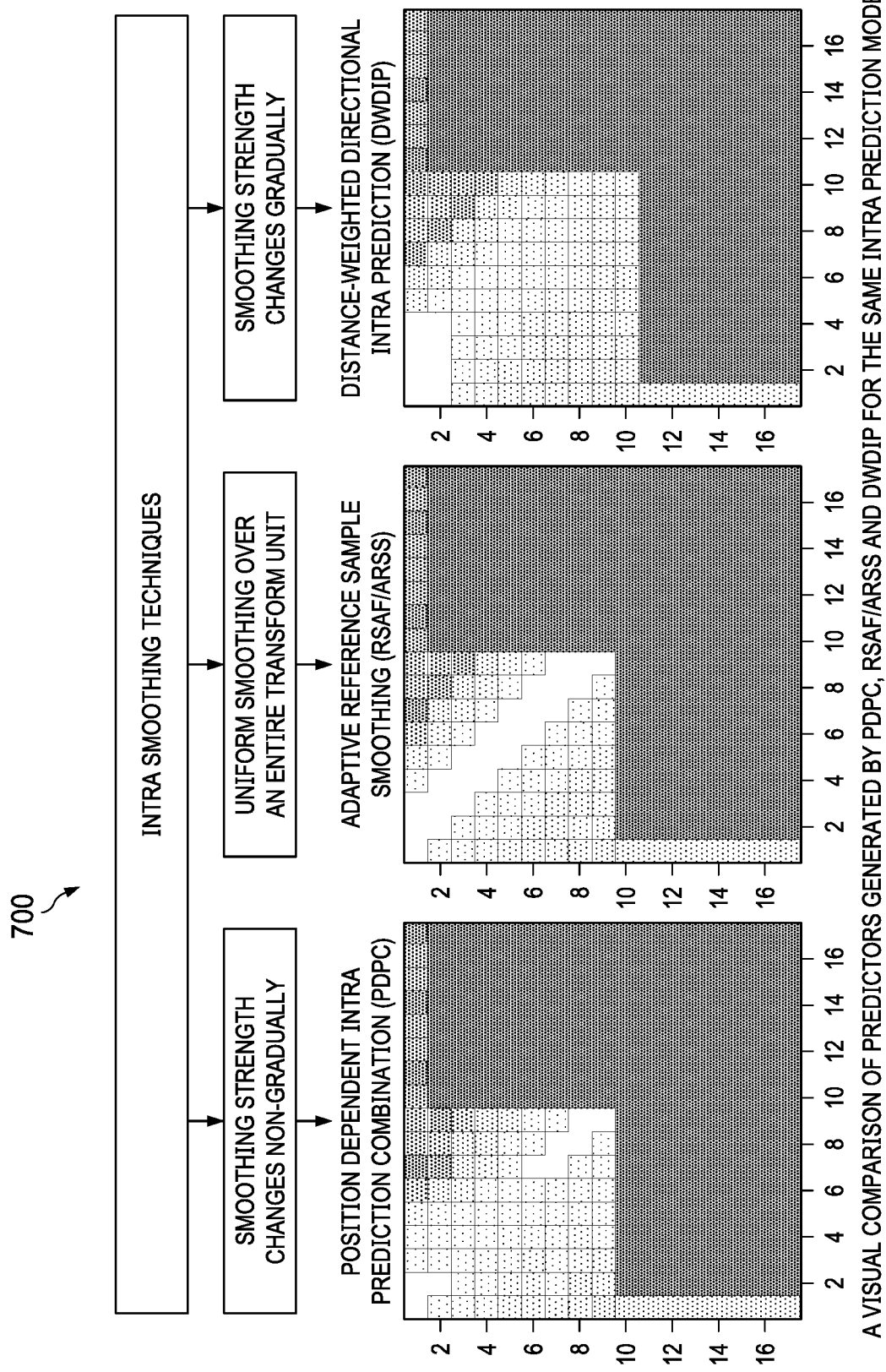
FIG. 7 is a visual comparison of predictors generated by position dependent intra prediction combination (PDPC), reference sample adaptive filter (RSAF)/adaptive reference sample smoothing (ARSS), and distance-weighted directional intra-prediction (DWDIP) for the same intra prediction mode.

FIG. 7 illustrates a visual comparison 700 of predictors generated by PDPC, reference sample adaptive filter (RSAF)/adaptive reference sample smoothing (ARSS), and DWDIP for the same intra prediction mode.

In current methods, a flag indicating whether bidirectional weighted intra prediction, such as a DWDIP or PDPC, has been enabled is signaled first. When the flag is set to a value of 1, the bidirectional weighted intra prediction is on, and when the flag is set to a value of 0 the bidirectional weighted intra prediction is off. After the flag has been signaled, the intra prediction mode is signaled. However, bidirectional weighted intra prediction only applies to directional intra prediction modes. Bidirectional weighted intra prediction does not apply to the DC or planar intra prediction modes. As such, there are signaling redundancies in conventional intra prediction techniques.

Disclosed herein are coding methods that signal a flag (e.g., a DWDIP flag) prior to the signaling of the intra prediction mode. By signaling the flag first, signaling redundancies are eliminated. As such, the overall coding process is improved and made more efficient.

Figure 8:
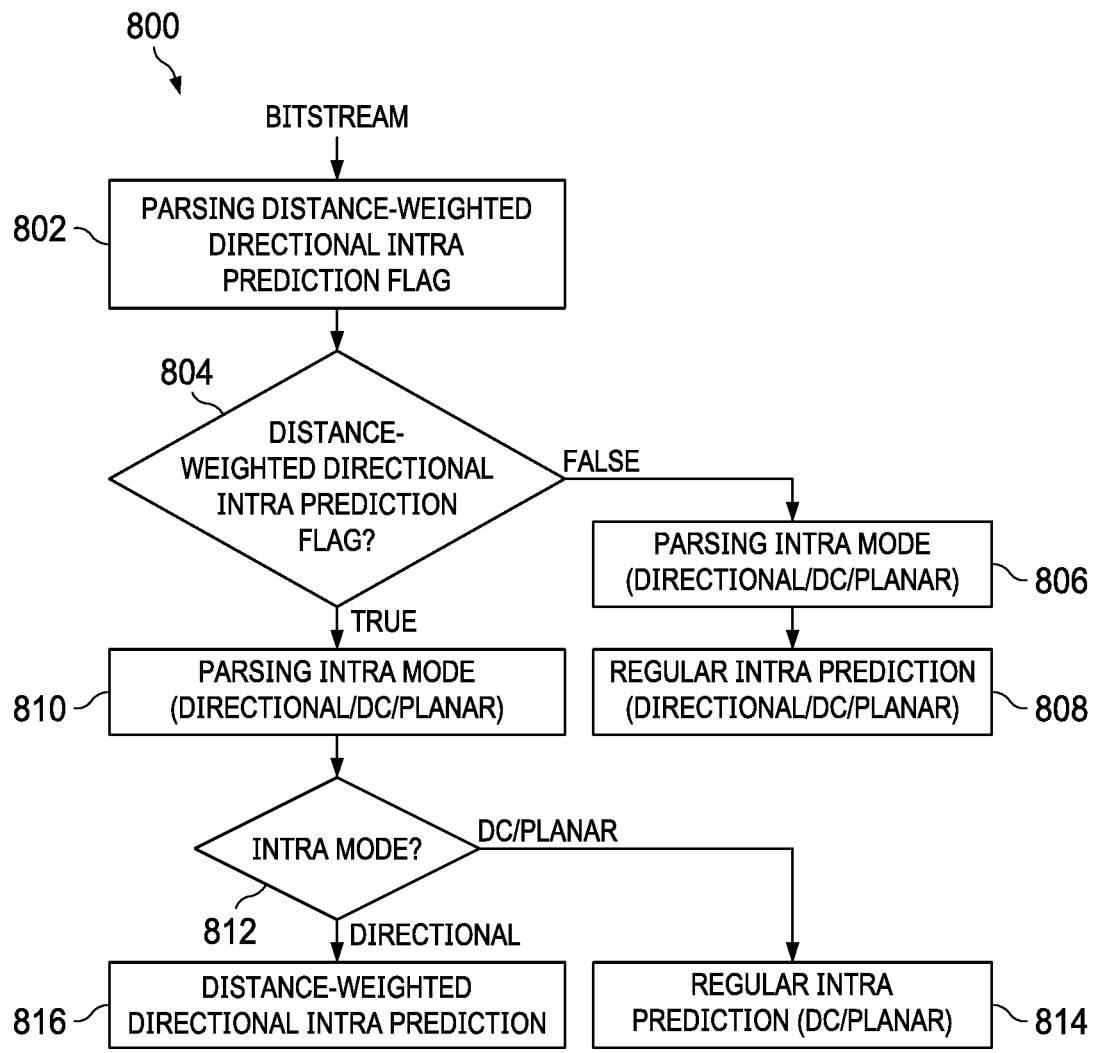
FIG. 8 is a coding method illustrating signaling redundancies.

FIG. 8 is a coding method 800 illustrating the signaling redundancies noted above. The coding method 800 may be implemented by a decoder such as the video decoder 30 in FIG. 1. While the coding method 800 in FIG. 8 depicts DWDIP coding, the same or similar redundancies may be found in other types of intra prediction.

As shown in FIG. 8, a bitstream is received by the decoder. The bitstream may be received from an encoder such as the video encoder 20 of FIG. 1. In block 802, a DWDIP flag from the bitstream is parsed. In block 804, a determination of whether DWDIP flag is true or false is made. That is, whether DWDIP is enabled or disabled, set to 1 or 0, and so on.

In block 806, when the DWDIP flag is false the bitstream is parsed to determine the intra prediction mode. Thereafter, in block 808 regular intra prediction is performed using the intra prediction mode that was determined.

In block 810, when the DWDIP flag is true the bitstream is parsed to determine the intra prediction mode. In block 812, a determination of whether the intra prediction mode is directional or non-directional (e.g., DC or planar) is made. When the intra prediction mode is non-directional, then in block 814 regular intra prediction is performed. When the intra prediction mode is directional, then in block 816 DWDIP is performed. As shown, the coding method 800 includes redundancies, which leads to inefficiency in the coding process.

Figure 9:
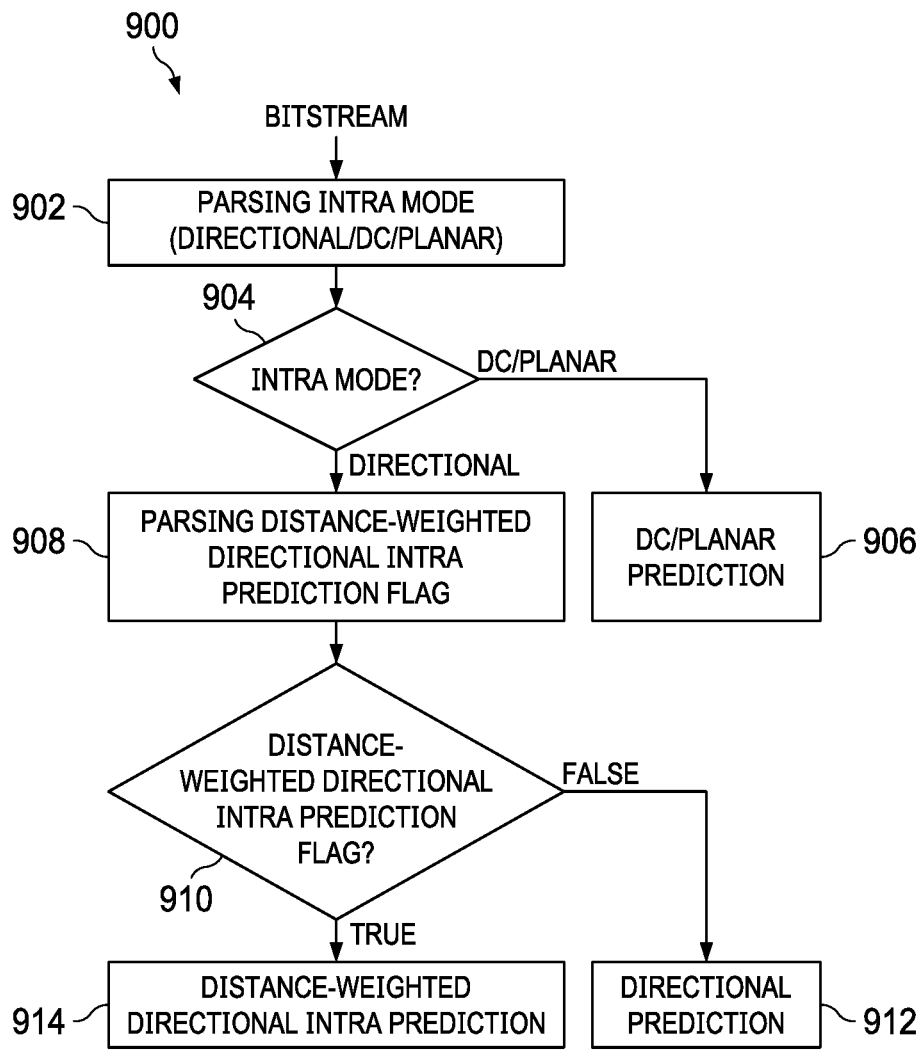
FIG. 9 is an embodiment of a coding method that removes the redundancies found in FIG. 8.

FIG. 9 illustrates an embodiment of a coding method 900 that removes the redundancies found in FIG. 8. In an embodiment, the coding method 900 is performed by a decoder such as the video decoder 30 of FIG. 1.

As shown in FIG. 9, a bitstream is received by the decoder. The bitstream may be received from an encoder such as the video encoder 20 of FIG. 1. In block 902, the bitstream is parsed to determine the intra prediction mode. In block 904, a determination of whether the intra prediction mode is directional or non-directional (e.g., DC or planar) is made. When the intra prediction mode is non-directional, then in block 906 non-directional intra prediction is performed and used to generate an image (e.g., a decoded picture) in accordance with the non-directional intra prediction mode that was determined.

When the intra prediction mode is directional, then in block 908 the DWDIP flag from the bitstream is parsed. In block 910, a determination of whether DWDIP flag is true or false is made. That is, whether DWDIP is enabled or disabled, set to 1 or 0, and so on.

In block 912, when the DWDIP flag is false directional intra prediction is performed and used to generate an image. In block 914, when the DWDIP flag is true DWDIP is performed and used to generate an image. In an embodiment, the image generated using one of the foregoing intra prediction techniques is displayed on the display of an electronic device.

In an embodiment, when the intra prediction mode is DC or planar, the DWDIP flag (e.g., the bidirectional weighted intra prediction flag) is not signaled and inferred to be equal to 0. Otherwise the DWDIP flag is signaled, where the value 1 is ON, and the value 0 is Off.

A syntax table that may be used for the parsing in the coding method 900 of FIG. 9 is shown below.

| Coding unit syntax | |
|---|---|
| coding_unit( x0, y0, log2CbSize ) { | Descriptor |
| ... | |
|     for( j = 0; j < nCbS; j = j + pbOffset ) | |
|       for( i = 0; i < nCbS; i = i + pbOffset ) | |
|         if( prev_intra_luma_pred_flag[ x0 + i ] | |
|         [ y0 + j ] ){ | |
|           mpm_idx[ x0 + i ][ y0 + j ] | ae(v) |
|         If(mpm_idx[ x0 + i ][ y0 + j ] >1) | |
|           dwdip_enable_flag[ x0 + i ][ y0 + j ] | u(1) |
|         } | |
|         else{ | |
|           rem_intra_luma_pred_mode[ x0 + i ] | ae(v) |
|         [ y0 + j ] | |
|         If(rem_intra_luma_pred_mode[ x0 + i ] | |
|         [ y0 + j ] >1) | |
|           dwdip_enable_flag[ x0 + i ][ y0 + j ] | u(1) |
|         } | |
| ... | |
| } | |

When the dwdip_enable_flag is equal to 1 it specifies that dwdip is enabled for the luma component in the current coding unit. When the dwdip_enable_flag is equal to 0 it specifies that dwdip is disabled for the luma component in the current coding unit. When the dwdip_enable_flag is not present, it is inferred to be equal to 0.

Figure 10:
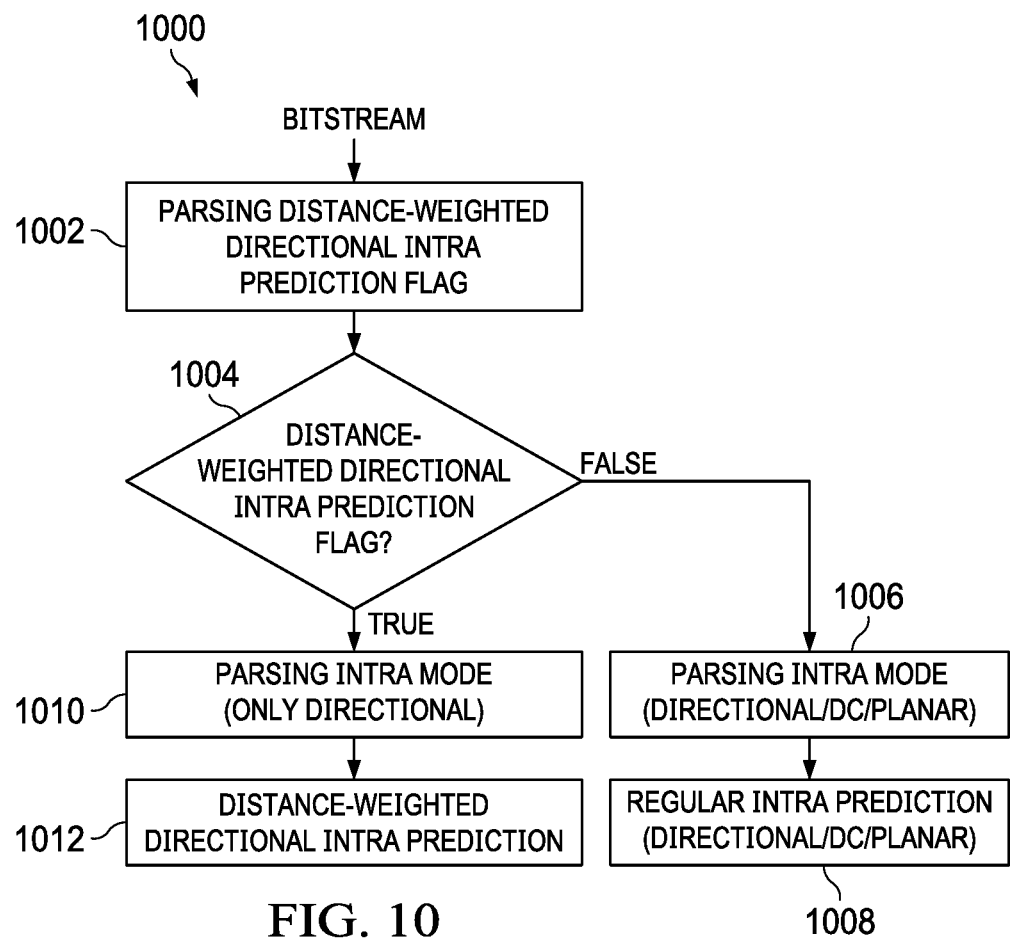
FIG. 10 is an embodiment of a coding method that removes the redundancies found in FIG. 8.

FIG. 10 illustrates an embodiment of a coding method 1000 that removes the redundancies found in FIG. 8. In an embodiment, the coding method 1000 is performed by a decoder such as the video decoder 30 of FIG. 1.

As shown in FIG. 10, a bitstream is received by the decoder. The bitstream may be received from an encoder such as the video encoder 20 of FIG. 1. In block 1002, the DWDIP flag from the bitstream is parsed. In block 1004, a determination of whether DWDIP flag is true or false is made. That is, whether DWDIP is enabled or disabled, set to 1 or 0, and so on.

In block 1006, when the DWDIP flag is false the bitstream is parsed to determine the intra prediction mode. In block 1008, regular intra prediction is performed to generate an image using the intra prediction mode that was determined.

In block 1010, when the DWDIP flag is true the bitstream is parsed to determine the intra prediction mode. However, only the directional intra prediction modes are considered. That is, the non-directional intra prediction modes (e.g., DC and planar) are not considered. In block 1012, DWDIP is performed to generate an image using the directional intra prediction mode that was determined.

In an embodiment, block 1010 is performed in two sub-steps. For example, an MPM list containing only directional intra prediction modes is parsed in a first sub-step in an effort to find an intra prediction mode. When the MPM list does not contain the intra prediction mode, any remaining directional intra prediction modes are parsed in a second sub-step. That is, the non-directional intra prediction modes are not considered.

In another embodiment, block 1010 is performed in two sub-steps. For example, an MPM list containing only directional intra prediction modes is parsed in a first sub-step in an effort to find an intra prediction mode. When the MPM list does not contain the intra prediction mode, any remaining intra prediction modes, including both directional and non-directional intra prediction modes, are parsed in a second sub-step. However, the non-directional intra prediction modes are the last ones considered. That is, the non-directional intra prediction modes occupy the last positions of the list of remaining intra prediction modes.

In an embodiment where the bidirectional weighted intra prediction flag was signaled first, when the bidirectional weighted intra prediction flag is equal to 0, e.g., not used, then conventional intra mode coding is performed (e.g., the coding in JEM or HEVC). Otherwise, when the bidirectional weighted intra prediction flag is equal to 1, e.g., used, then the intra mode coding is modified, the DC and planar modes are removed from the intra mode list. First when the MPM list is formed, the DC and planar modes are removed and other modes are used to fill the list. That is, the MPM list can be any directional intra modes except DC and planar. The remaining modes are the directional intra prediction modes that were not used in the MPM list.

In an embodiment where the bidirectional weighted intra prediction flag was signaled first, when the DWDIP flag is equal to 0, e.g., not used, then conventional intra mode coding is performed. Otherwise, when the bidirectional weighted intra prediction flag is equal to 1, e.g., used, then the intra mode coding is modified by moving the DC and planar modes to the last two positions in the remaining mode binarization table. By doing this, other remaining modes may use less bits (bins) to code. That is, the MPM list can be any directional intra modes except DC and planar. The remaining modes are the intra modes (including directional intra mode and DC and planar) which were not used in the MPM list.

A syntax table that may be used for the parsing in the coding method 1000 of FIG. 10 is shown below.

The syntax table of parsing method is shown below.

| Coding unit syntax | |
|---|---|
| coding_unit( x0, y0, log2CbSize ) { | Descriptor |
| ... | |
|   for( j = 0; j < nCbS; j = j + pbOffset ) | |
|     for( i = 0; i < nCbS; i = i + pbOffset ){ | |
|       dwdip_enable_flag[ x0 + i ][ y0 + j ] | u(1) |
|       if(!dwdip_enable_flag[ x0 + i ][ y0 + j ]){ | |
|         if( prev_intra_luma_pred_flag[ x0 + i ] | |
|         [ y0 + j ] ) | |
|           mpm_idx[ x0 + i ][ y0 + j ] | ae(v) |
|         else | |
|           rem_intra_luma_pred_mode[ x0 + i ] | ae(v) |
|         [ y0 + j ] | |
|       } | |
|       else{ | |
|         if( prev_intra_luma_pred_flag[ x0 + i ] | |
|         [ y0 + j ] ) | |
|           mpm_idx[ x0 + i ][ y0 + j ] | ae(v) |
|         else | |
|           rem_intra_luma_pred_mode[ x0 + i ] | ae(v) |
|         [ y0 + j ] | |
|       } | |
| ... | |
| } | |

When the dwdip_enable_flag is equal to 1 it specifies that dwdip is enabled for the luma component in the current coding unit. When the dwdip_enable_flag is equal to 0 it specifies that dwdip is disabled for the luma component in the current coding unit. When the dwdip_enable_flag is not present, it is inferred to be equal to 0.

The syntax elements prev_intra_luma_pred_flag[x0+i][y0+j], mpm_idx [x0+i][y0+j] and rem_intra_luma_pred_mode[x0+i][y0+j] specify the intra prediction mode for luma samples. Use 35 intra prediction modes for example.

Input to the process is a luma location (xPb, yPb) specifying the top-left sample of the current luma prediction block relative to the top-left luma sample of the current picture.

In this process, the luma intra prediction mode IntraPredModeY[xPb][yPb] is derived.

When dwdip_enable_flag equal to 1(DWDIP TRUE ON), IntraPredModeY[xPb][yPb] is derived by the following ordered steps.

Specification of intra prediction mode and associated names

| Intra prediction mode | Associated name |
| --- | --- |
| 0 | INTRA_ANGULAR26 |
| 1 | INTRA_ANGULAR10 |
| 2 ... 9 | INTRA_ANGULAR2 ... INTRA_ANGULAR9 |
| 10 ... 24 | INTRA_ANGULAR11 ... INTRA_ANGULAR25 |
| 25 ... 32 | INTRA_ANGULAR27 ... INTRA_ANGULAR34 |

First, the neighbouring locations (xNbA, yNbA) and (xNbB, yNbB) are set equal to (xPb−1, yPb) and (xPb, yPb−1), respectively. Second, for X being replaced by either A or B, the variables candIntraPredModeX are derived as follows. The availability derivation process for a block in z-scan order is invoked with the location (xCurr, yCurr) set equal to (xPb, yPb) and the neighbouring location (xNbY, yNbY) set equal to (xNbX, yNbX) as inputs, and the output is assigned to availableX. The candidate intra prediction mode candIntraPredModeX is derived as follows. If availableX is equal to FALSE, candIntraPredModeX is set equal to INTRA_ANGULAR26. Otherwise, if CuPredMode[xNbX][yNbX] is not equal to MODE_INTRA or pcm_flag [xNbX][yNbX] is equal to 1, candIntraPredModeX is set equal to INTRA_ANGULAR26. Otherwise, if X is equal to B and yPb−1 is less than ((yPb>>CtbLog 2SizeY)<<CtbLog 2SizeY), candIntraPredModeB is set equal to INTRA_ANGULAR26. Otherwise, candIntraPredModeX is set equal to IntraPredModeY[xNbX][yNbX].

Third, the candModeList[x] with x=0 ... 2 is derived as follows. If candIntraPredModeB is equal to candIntraPredModeA, the following applies. If candIntraPredModeA is equal to INTRA_ANGULAR26 or INTRA_ANGULAR10, candModeList[x] with x=0 ... 2 is derived as follows:

$$\text{candModeList}[0]=\text{INTRA\_ANGULAR26} \quad (8\text{-}15)$$

$$\text{candModeList}[1]=\text{INTRA\_ANGULAR10} \quad (8\text{-}16)$$

$$\text{candModeList}[2]=\text{INTRA\_ANGULAR2} \quad (8\text{-}17)$$

Otherwise, candModeList[x] with x=0 ... 2 is derived as follows:

$$\text{candModeList}[0]=\text{candIntraPredMode}A \quad (8\text{-}18)$$

$$\text{candModeList}[1]=(\text{candIntraPredMode}A+29)\%32 \quad (8\text{-}19)$$

$$\text{candModeList}[2]=(\text{candIntraPredMode}A-2+1)\%32 \quad (8\text{-}20)$$

Otherwise (candIntraPredModeB is not equal to candIntraPredModeA), the following applies: candModeList[0] and candModeList[1] are derived as follows:

$$\text{candModeList}[0]=\text{candIntraPredMode}A \quad (8\text{-}21)$$

$$\text{candModeList}[1]=\text{candIntraPredMode}B \quad (8\text{-}22)$$

If neither of candModeList[0] and candModeList[1] is equal to INTRA_ANGULAR10, candModeList[2] is set equal to INTRA_ANGULAR10. Otherwise, if neither of candModeList[0] and candModeList[1] is equal to INTRA_ANGULAR26, candModeList[2] is set equal to INTRA_ANGULAR26. Otherwise, candModeList[2] is set equal to INTRA_ANGULAR2.

Fourth, IntraPredModeY[xPb][yPb] is derived by applying the following procedure. If prev_intra_luma_pred_flag [xPb][yPb] is equal to 1, the IntraPredModeY[xPb][yPb] is set equal to candModeList[mpm_idx]. Otherwise, IntraPredModeY[xPb][yPb] is derived by applying the following ordered steps. The array candModeList[x], x=0 ... 2 is modified as the following ordered steps. When candModeList[0] is greater than candModeList[1], both values are swapped as follows:

$$(\text{candModeList}[0],\text{candModeList}[1])=\text{Swap}(\text{candModeList}[0],\text{candModeList}[1]) \quad (8\text{-}23)$$

When candModeList[0] is greater than candModeList[2], both values are swapped as follows:

$$(\text{candModeList}[0],\text{candModeList}[2])=\text{Swap}(\text{candModeList}[0],\text{candModeList}[2]) \quad (8\text{-}24)$$

When candModeList[1] is greater than candModeList[2], both values are swapped as follows:

$$(\text{candModeList}[1],\text{candModeList}[2])=\text{Swap}(\text{candModeList}[1],\text{candModeList}[2]) \quad (8\text{-}25)$$

IntraPredModeY[xPb][yPb] is derived by the following ordered steps. IntraPredModeY[xPb][yPb] is set equal to rem_intra_luma_pred_mode[xPb][yPb]. For i equal to 0 to 2, inclusive, when IntraPredModeY[xPb][yPb] is greater than or equal to candModeList[i], the value of IntraPredModeY[xPb][yPb] is incremented by one.

When dwdip_enable_flag is equal to 0 (DWDIP TRUE OFF), IntraPredModeY[xPb][yPb] is derived by the following ordered steps.

Specification of intra prediction mode and associated names

| Intra prediction mode | Associated name |
| --- | --- |
| 0 | INTRA_PLANAR |
| 1 | INTRA_DC |
| 2 ... 34 | INTRA_ANGULAR2 ... INTRA_ANGULAR34 |

First, the neighboring locations (xNbA, yNbA) and (xNbB, yNbB) are set equal to (xPb−1, yPb) and (xPb, yPb−1), respectively. Second, for X being replaced by either A or B, the variables candIntraPredModeX are derived as follows. The availability derivation process for a block in z-scan order is invoked with the location (xCurr, yCurr) set equal to (xPb, yPb) and the neighbouring location (xNbY, yNbY) set equal to (xNbX, yNbX) as inputs, and the output is assigned to availableX. The candidate intra prediction mode candIntraPredModeX is derived as follows. If availableX is equal to FALSE, candIntraPredModeX is set equal to INTRA_DC. Otherwise, if CuPredMode[xNbX][yNbX]

is not equal to MODE_INTRA or pcm_flag[xNbX][yNbX] is equal to 1, candIntraPredModeX is set equal to INTRA_DC. Otherwise, if X is equal to B and yPb−1 is less than ((yPb>>CtbLog 2SizeY)<<CtbLog 2SizeY), candIntraPredModeB is set equal to INTRA_DC. Otherwise, candIntraPredModeX is set equal to IntraPredModeY[xNbX][yNbX].

Third, the candModeList[x] with x=0 . . . 2 is derived as follows. If candIntraPredModeB is equal to candIntraPredModeA, the following applies. If candIntraPredModeA is less than 2 (i.e. equal to INTRA_PLANAR or INTRA_DC), candModeList[x] with x=0 . . . 2 is derived as follows:

candModeList[0]=INTRA_PLANAR    (8-15)

candModeList[1]=INTRA_DC    (8-16)

candModeList[2]=INTRA_ANGULAR26    (8-17)

Otherwise, candModeList[x] with x=0 . . . 2 is derived as follows:

candModeList[0]=candIntraPredModeA    (8-18)

candModeList[1]=2+(candIntraPredModeA+29)%32    (8-19)

candModeList[2]=2+(candIntraPredModeA−2+1)%32    (8-20)

Otherwise (candIntraPredModeB is not equal to candIntraPredModeA), the following applies:
candModeList[0] and candModeList[1] are derived as follows:

candModeList[0]=candIntraPredModeA    (8-21)

candModeList[1]=candIntraPredModeB    (8-22)

If neither of candModeList[0] and candModeList[1] is equal to INTRA_PLANAR, candModeList[2] is set equal to INTRA_PLANAR. Otherwise, if neither of candModeList[0] and candModeList[1] is equal to INTRA_DC, candModeList[2] is set equal to INTRA_DC. Otherwise, candModeList[2] is set equal to INTRA_ANGULAR26.

Fourth, IntraPredModeY[xPb][yPb] is derived by applying the following procedure. If prev_intra_luma_pred_flag[xPb][yPb] is equal to 1, the IntraPredModeY[xPb][yPb] is set equal to candModeList[mpm_idx]. Otherwise, IntraPredModeY[xPb][yPb] is derived by applying the following ordered steps. The array candModeList[x], x=0 . . . 2 is modified as the following ordered steps. When candModeList[0] is greater than candModeList[1], both values are swapped as follows:

(candModeList[0],candModeList[1])=Swap(candModeList[0],candModeList[1])    (8-23)

When candModeList[0] is greater than candModeList[2], both values are swapped as follows:

(candModeList[0],candModeList[2])=Swap(candModeList[0],candModeList[2])    (8-24)

When candModeList[1] is greater than candModeList[2], both values are swapped as follows:

(candModeList[1],candModeList[2])=Swap(candModeList[1],candModeList[2])    (8-25)

IntraPredModeY[xPb][yPb] is derived by the following ordered steps. IntraPredModeY[xPb][yPb] is set equal to rem_intra_luma_pred_mode[xPb][yPb]. For i equal to 0 to 2, inclusive, when IntraPredModeY[xPb][yPb] is greater than or equal to candModeList[i], the value of IntraPredModeY[xPb][yPb] is incremented by one.

Figure 11:
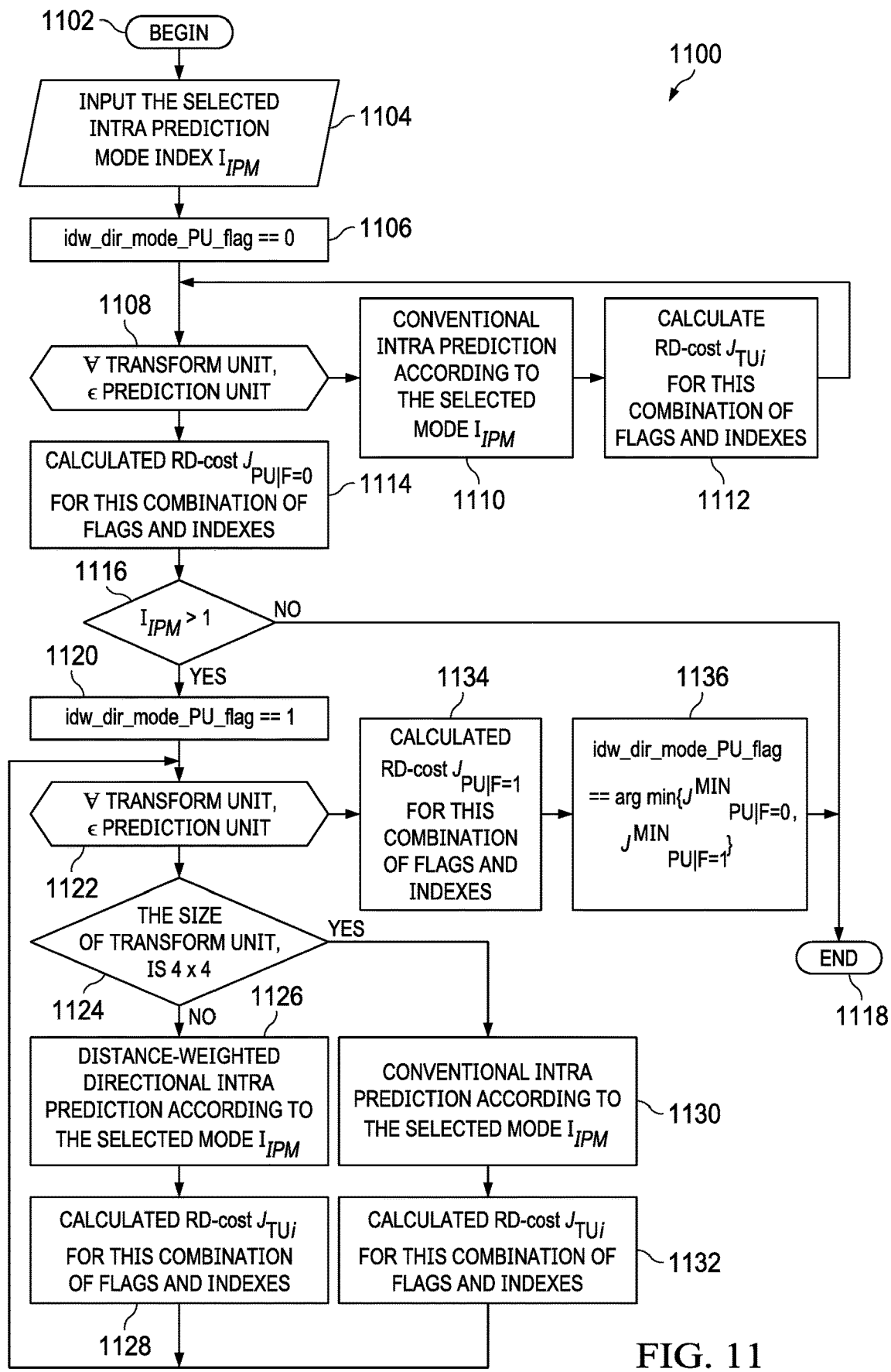
FIG. 11 is an embodiment of coding method.

FIG. 11 depicts an embodiment of coding method 1100. The coding method 1100 may be implemented by an encoder such as, for example, video encoder 20 of FIG. 1. As will be more fully explained below, the coding method 1100 may utilize DWDIP for intra prediction in some circumstances.

In block 1102, the coding method 1100 begins. In block 1104, the selected intra prediction mode index $I_{IPM}$ is input into the encoder. In block 1106, a check is made to determine whether the idw_dir_mode_PU_flag is set to zero. If the idw_dir_mode_PU_flag is set to zero, then DWDIP processing is not enabled.

In block 1108, a loop begins so that RD-costs are calculated for all of the TUs in the PU. In block 1110, conventional intra prediction is performed according to the selected intra prediction mode index $I_{IPM}$. In block 1112, an RD cost $J_{TUi}$ for each TU is calculated for this combination of flags and indexes (e.g., the idw_dir_mode_PU_flag being set to zero and the selected intra prediction mode index $I_{IPM}$). Following block 1112, the coding method 1100 returns to block 1108 until the loop is completed for all of the TUs in the PU. Once the loop has been completed, in block 1114 an RD cost $J_{PU|F=0}$ for the PU for the combination of flags and indexes is determined.

In block 1116, a determination of whether the selected intra prediction mode index $I_{IPM}$ is greater than one. If not, the coding method 1100 proceeds to block 1118 and ends. If so, in block 1120 a check is made to determine whether the idw_dir_mode_PU_flag is set to one. If the idw_dir_mode_PU_flag is set to one, then DWDIP processing is enabled.

In block 1122, a loop begins so that RD-costs are calculated for all of the TUs in the PU. In block 1124, a determination of whether the size of the $TU_i$ is 4×4. If not, in block 1126 DWDIP is performed according to the selected intra prediction mode index $I_{IPM}$. In block 1128, an RD cost $J_{TUi}$ for each TU is calculated for this combination of flags and indexes (e.g., the idw_dir_mode_PU_flag being set to one and the selected intra prediction mode index $I_{IPM}$). Following block 1112, the coding method 1100 returns to block 1122 until the loop is completed for all of the TUs in the PU.

If the size of the $TU_i$ is 4×4, in block 1130 conventional intra prediction is performed according to the selected intra prediction mode index $I_{IPM}$ In block 1132, an RD cost $J_{TUi}$ for each TU is calculated for this combination of flags and indexes (e.g., the idw_dir_mode_PU_flag being set to one and the selected intra prediction mode index $I_{IPM}$). Following block 1132, the coding method 1100 returns to block 1122 until the loop is completed for all of the TUs in the PU. Once the loop has been completed, in block 1134 an RD cost $J_{PU|F=1}$ for the PU for the combination of flags and indexes is determined. In block 1136 a check is made to determine whether the idw_dir_mode_PU_flag is equal to the minimum of the RD cost $J_{PU|F=0}$ and the RD cost $J_{PU|F=1}$. Then, the coding method 1100 proceeds to block 1118 and ends.

Figure 12:
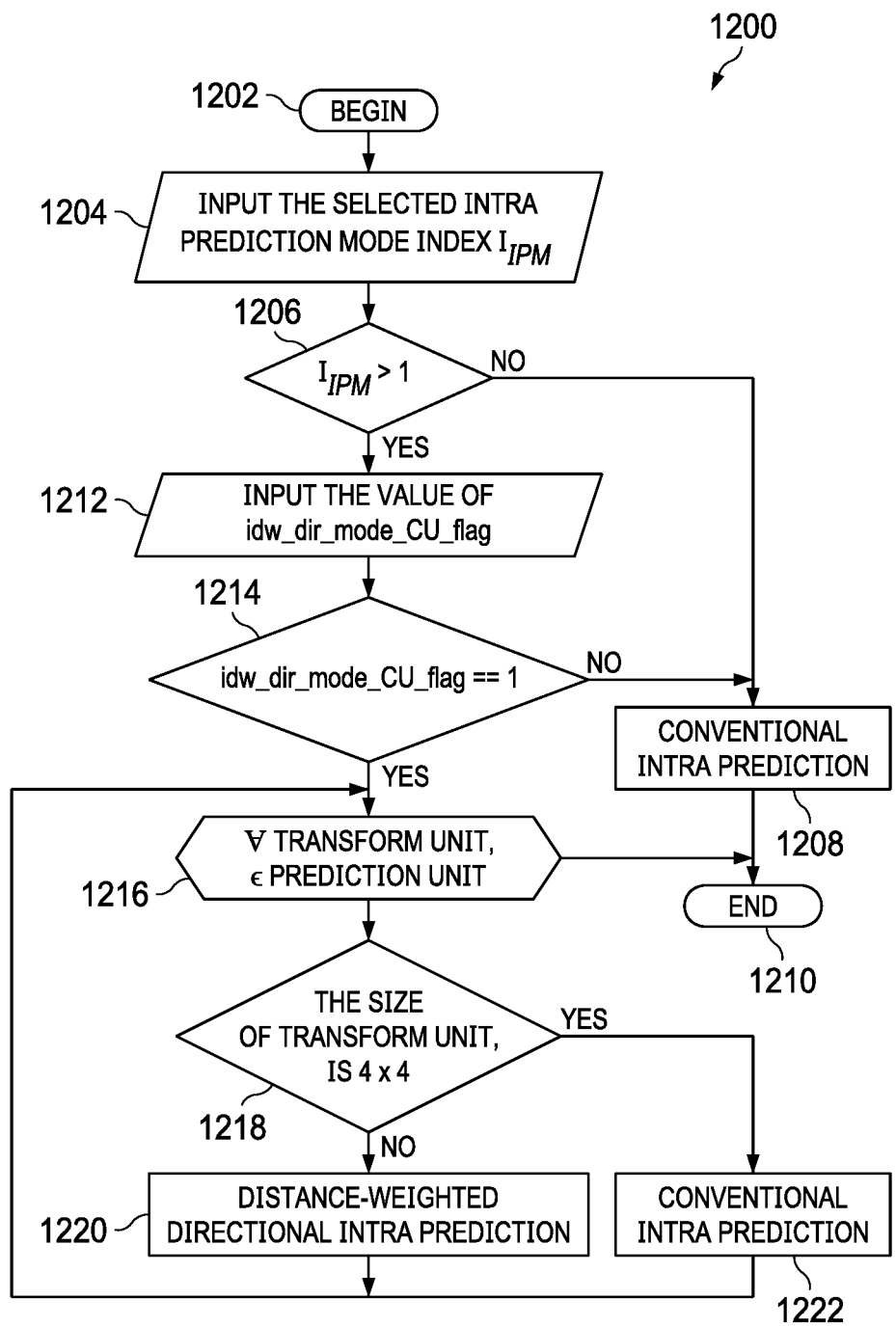
FIG. 12 is an embodiment of coding method.

FIG. 12 depicts an embodiment of coding method 1200. The coding method 1200 may be implemented by a decoder such as, for example, video decoder 30 of FIG. 1. As will be more fully explained below, the coding method 1200 may utilize DWDIP for intra prediction in some circumstances.

In block 1202, the coding method 1200 begins. In block 1204, the selected intra prediction mode index $I_{IPM}$ is input into the decoder. In block 1206, a determination of whether the selected intra prediction mode index $I_{IPM}$ is greater than one is made. If not, the coding method 1200 proceeds to block 1208 and conventional intra prediction is performed. Then, the coding method 1200 proceeds to block 1210 and ends.

If the selected intra prediction mode index $I_{IPM}$ is greater than one, in block 1212 the value of idw_dir_mode_CU_flag is input into the decoder. In block 1214, a check is made to determine whether the idw_dir_mode_CU_flag is set to one. If the idw_dir_mode_CU_flag is set not set to one, then the coding method 1200 proceeds to block 1208 and conventional intra prediction is performed. Thereafter, the coding method 1200 ends in block 1210.

If the idw_dir_mode_CU_flag is set to one, in block 1216 a loop begins so that RD-costs are calculated for all of the TUs in the PU. In block 1218, a determination of whether the size of the $TU_i$ is 4×4 is made. If not, in block 1220 DWDIP is performed. Following block 1220, the coding method 1200 returns to block 1216 until the loop is completed for all of the TUs in the PU. If the size of the $TU_i$ is 4×4, in block 1222 conventional intra prediction is performed. Following block 1222, the coding method 1200 returns to block 1216 until the loop is completed for all of the TUs in the PU. Once the loop has been completed at block 1216, the coding method 1200 proceeds to block 1210 and the coding method 1200 ends.

In an embodiment, the order of the intra mode is changed. As before, input to the process is a luma location (xPb, yPb) specifying the top-left sample of the current luma prediction block relative to the top-left luma sample of the current picture.

In this process, the luma intra prediction mode IntraPredModeY[xPb][yPb] is derived.

When dwdip_enable_flag equal to 1 (DWDIP TRUE ON), IntraPredModeY[xPb][yPb] is derived by the following ordered steps.

| Specification of intra prediction mode and associated names | |
|---|---|
| Intra prediction mode | Associated name |
| 0 | INTRA_ANGULAR26 |
| 1 | INTRA_ANGULAR10 |
| 2 . . . 9 | INTRA_ANGULAR2 . . . INTRA_ANGULAR9 |
| 10~24 | INTRA_ANGULAR11 . . . .INTRA_ANGULAR25 |
| 25~32 | INTRA_ANGULAR27 . . . .INTRA_ANGULAR35 |
| 33 | DC |
| 34 | PLANAR |

First, the neighboring locations (xNbA, yNbA) and (xNbB, yNbB) are set equal to (xPb−1, yPb) and (xPb, yPb−1), respectively. Second, for X being replaced by either A or B, the variables candIntraPredModeX are derived as follows. The availability derivation process for a block in z-scan order is invoked with the location (xCurr, yCurr) set equal to (xPb, yPb) and the neighbouring location (xNbY, yNbY) set equal to (xNbX, yNbX) as inputs, and the output is assigned to availableX. The candidate intra prediction mode candIntraPredModeX is derived as follows. If availableX is equal to FALSE, candIntraPredModeX is set equal to INTRA_ANGULAR26. Otherwise, if CuPredMode[xNbX][yNbX] is not equal to MODE_INTRA or pcm_flag [xNbX][yNbX] is equal to 1, candIntraPredModeX is set equal to INTRA_ANGULAR26. Otherwise, if X is equal to B and yPb−1 is less than ((yPb>>CtbLog 2SizeY)<<CtbLog 2SizeY), candIntraPredModeB is set equal to INTRA_ANGULAR26. Otherwise, candIntraPredModeX is set equal to IntraPredModeY[xNbX][yNbX].

Third, the candModeList[x] with x=0 . . . 2 is derived as follows. If candIntraPredModeB is equal to candIntraPredModeA, the following applies. If candIntraPredModeA is equal to INTRA_ANGULAR26 or INTRA_ANGULAR10, candModeList[x] with x=0 . . . 2 is derived as follows:

$$candModeList[0]=INTRA\_ANGULAR26 \quad (8\text{-}15)$$

$$candModeList[1]=INTRA\_ANGULAR10 \quad (8\text{-}16)$$

$$candModeList[2]=INTRA\_ANGULAR2 \quad (8\text{-}17)$$

Otherwise, candModeList[x] with x=0 . . . 2 is derived as follows:

$$candModeList[0]=candIntraPredModeA \quad (8\text{-}18)$$

$$candModeList[1]=(candIntraPredModeA+29)\% \ 32 \quad (8\text{-}19)$$

$$candModeList[2]=(candIntraPredModeA-2+1)\% \ 32 \quad (8\text{-}20)$$

Otherwise (candIntraPredModeB is not equal to candIntraPredModeA), the following applies:
candModeList[0] and candModeList[1] are derived as follows:

$$candModeList[0]=candIntraPredModeA \quad (8\text{-}21)$$

$$candModeList[1]=candIntraPredModeB \quad (8\text{-}22)$$

If neither of candModeList[0] and candModeList[1] is equal to INTRA_ANGULAR10, candModeList[2] is set equal to INTRA_ANGULAR10. Otherwise, if neither of candModeList[0] and candModeList[1] is equal to INTRA_ANGULAR26, candModeList[2] is set equal to INTRA_ANGULAR26. Otherwise, candModeList[2] is set equal to INTRA_ANGULAR2.

Fourth, IntraPredModeY[xPb][yPb] is derived by applying the following procedure. If prev_intra_luma_pred_flag [xPb][yPb] is equal to 1, the IntraPredModeY[xPb][yPb] is set equal to candModeList[mpm_idx]. Otherwise, IntraPredModeY[xPb][yPb] is derived by applying the following ordered steps. The array candModeList[x], x=0 . . . 2 is modified as the following ordered steps: When candModeList[0] is greater than candModeList[1], both values are swapped as follows:

$$(candModeList[0],candModeList[1])=Swap(candModeList[0],candModeList[1]) \quad (8\text{-}23)$$

When candModeList[0] is greater than candModeList[2], both values are swapped as follows:

$$(candModeList[0],candModeList[2])=Swap(candModeList[0],candModeList[2]) \quad (8\text{-}24)$$

When candModeList[1] is greater than candModeList[2], both values are swapped as follows:

$$(candModeList[1],candModeList[2])=Swap(candModeList[1],candModeList[2]) \quad (8\text{-}25)$$

Next, IntraPredModeY[xPb][yPb] is derived by the following ordered steps. IntraPredModeY[xPb][yPb] is set equal to rem_intra_luma_pred_mode[xPb][yPb]. For i equal to 0 to 2, inclusive, when IntraPredModeY[xPb][yPb] is greater than or equal to candModeList[i], the value of IntraPredModeY[xPb][yPb] is incremented by one.

When dwdip_enable_flag equal to 0 (DWDIP TRUE OFF), IntraPredModeY[xPb][yPb] is derived by the following ordered steps.

| Specification of intra prediction mode and associated names | |
| --- | --- |
| Intra prediction mode | Associated name |
| 0 | INTRA_PLANAR |
| 1 | INTRA_DC |
| 2 ... 34 | INTRA_ANGULAR2 ... INTRA_ANGULAR34 |

First, the neighboring locations (xNbA, yNbA) and (xNbB, yNbB) are set equal to (xPb−1, yPb) and (xPb, yPb−1), respectively. Second, for X being replaced by either A or B, the variables candIntraPredModeX are derived as follows. The availability derivation process for a block in z-scan order as specified in subclause 6.4.1 is invoked with the location (xCurr, yCurr) set equal to (xPb, yPb) and the neighbouring location (xNbY, yNbY) set equal to (xNbX, yNbX) as inputs, and the output is assigned to availableX. The candidate intra prediction mode candIntraPredModeX is derived as follows. If availableX is equal to FALSE, candIntraPredModeX is set equal to INTRA_DC. Otherwise, if CuPredMode[xNbX][yNbX] is not equal to MODE_INTRA or pcm_flag[xNbX][yNbX] is equal to 1, candIntraPredModeX is set equal to INTRA_DC. Otherwise, if X is equal to B and yPb−1 is less than ((yPb>>CtbLog 2SizeY)<<CtbLog 2SizeY), candIntraPredModeB is set equal to INTRA_DC. Otherwise, candIntraPredModeX is set equal to IntraPredModeY[xNbX][yNbX].

Third, the candModeList[x] with x=0 . . . 2 is derived as follows. If candIntraPredModeB is equal to candIntraPredModeA, the following applies. If candIntraPredModeA is less than 2 (i.e. equal to INTRA_PLANAR or INTRA_DC), candModeList[x] with x=0 . . . 2 is derived as follows:

$$candModeList[0]=INTRA\_PLANAR \quad (8\text{-}15)$$

$$candModeList[1]=INTRA\_DC \quad (8\text{-}16)$$

$$candModeList[2]=INTRA\_ANGULAR26 \quad (8\text{-}17)$$

Otherwise, candModeList[x] with x=0 . . . 2 is derived as follows:

$$candModeList[0]=candIntraPredModeA \quad (8\text{-}18)$$

$$candModeList[1]=2+(candIntraPredModeA+29)\% 32 \quad (8\text{-}19)$$

$$candModeList[2]=2+(candIntraPredModeA-2+1)\% 32 \quad (8\text{-}20)$$

Otherwise (candIntraPredModeB is not equal to candIntraPredModeA), the following applies:
candModeList[0] and candModeList[1] are derived as follows:

$$candModeList[0]=candIntraPredModeA \quad (8\text{-}21)$$

$$candModeList[1]=candIntraPredModeB \quad (8\text{-}22)$$

If neither of candModeList[0] and candModeList[1] is equal to INTRA_PLANAR, candModeList[2] is set equal to INTRA_PLANAR. Otherwise, if neither of candModeList[0] and candModeList[1] is equal to INTRA_DC, candModeList[2] is set equal to INTRA_DC. Otherwise, candModeList[2] is set equal to INTRA_ANGULAR26.

Fourth, IntraPredModeY[xPb][yPb] is derived by applying the following procedure. If prev_intra_luma_pred_flag [xPb][yPb] is equal to 1, the IntraPredModeY[xPb][yPb] is set equal to candModeList[mpm_idx]. Otherwise, IntraPredModeY[xPb][yPb] is derived by applying the following ordered steps. The array candModeList[x], x=0 . . . 2 is modified as the following ordered steps. When candModeList[0] is greater than candModeList[1], both values are swapped as follows:

$$(candModeList[0],candModeList[1])=Swap(candModeList[0],candModeList[1]) \quad (8\text{-}23)$$

When candModeList[0] is greater than candModeList[2], both values are swapped as follows:

$$(candModeList[0],candModeList[2])=Swap(candModeList[0],candModeList[2]) \quad (8\text{-}24)$$

When candModeList[1] is greater than candModeList[2], both values are swapped as follows:

$$(candModeList[1],candModeList[2])=Swap(candModeList[1],candModeList[2]) \quad (8\text{-}25)$$

Next, IntraPredModeY[xPb][yPb] is derived by the following ordered steps. IntraPredModeY[xPb][yPb] is set equal to rem_intra_luma_pred_mode[xPb][yPb]. For i equal to 0 to 2, inclusive, when IntraPredModeY[xPb][yPb] is greater than or equal to candModeList[i], the value of IntraPredModeY[xPb][yPb] is incremented by one.

In conventional methods h bidirectional intra prediction flag is parsed before intra mode in bidirectional ultra prediction, however, bidirectional intra prediction is applied only on directional intra mode, not on DC or planar mode. Therefore, signaling redundancy exists. In the solution of the present disclosure the parsing order of bidirectional intra prediction flag and intra mode is changed. In addition, the number of intra modes is also changed. Furthermore, the order of intra modes is changed.

In an embodiment, DWDIP may be replaced by other intra prediction mechanisms in which DC and planar modes are not used. Indeed, there are many bidirectional weighted intra prediction methods (e.g., PDPC, DWDIP, etc.). In the present disclosure, DWDIP is utilized only for the purpose of illustration and is not meant to be limiting.

Here HEVC (35 intra modes, 3 MPM, 32 remaining modes) and JEM (67 intra modes, 6 MPM, 61 remaining modes coded in two levels) may be used. In the present disclosure, take HEVC (35 intra modes, 3 MPM) as an example.

Figure 13:
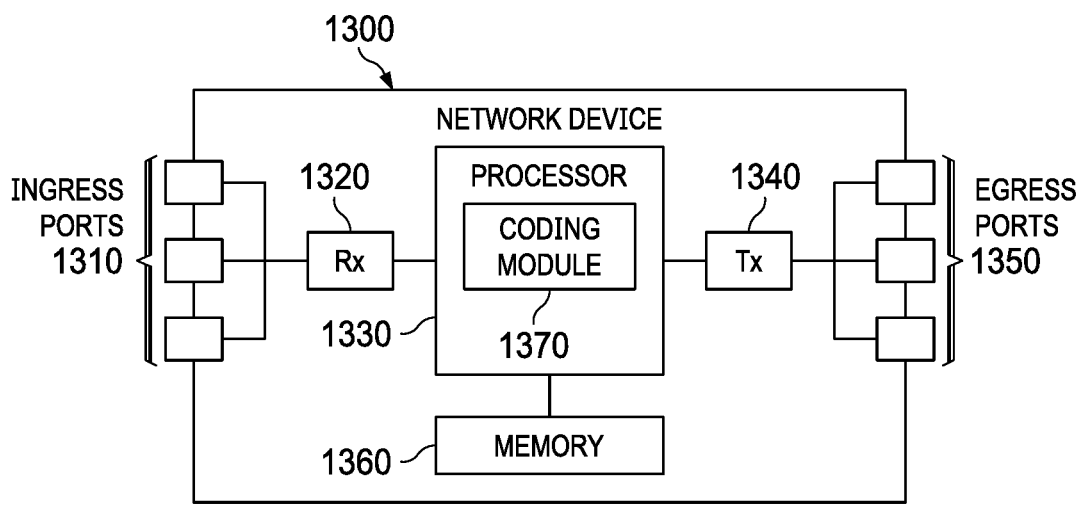
FIG. 13 a schematic diagram of a network device (e.g., a coding device).

FIG. 13 is a schematic diagram of a network device 1300 (e.g., a coding device) according to an embodiment of the disclosure. The network device 1300 is suitable for implementing the disclosed embodiments as described herein. In an embodiment, the network device 1300 may be a decoder such as video decoder 30 of FIG. 1 or an encoder such as video encoder 20 of FIG. 1. In an embodiment, the network device 1300 may be one or more components of the video decoder 30 of FIG. 1 or the video encoder 20 of FIG. 1 as described above.

The network device 1300 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data. The network device 1300 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by hardware and software. The processor 1330 may be implemented as one or more CPU chips, cores (e.g., as a multi-core processor), FPGAs, ASICs, and DSPs. The processor 1330 is in communication with the ingress ports 1310, receiver units 1320, transmitter units 1340, egress ports 1350, and memory 1360.

The processor 1330 comprises a coding module 1370. The coding module 1370 implements the disclosed embodiments described above. For instance, the coding module 1370 implements, processes, prepares, or provides the various coding operations. The inclusion of the coding module 1370 therefore provides a substantial improvement to the functionality of the network device 1300 and effects a transformation of the network device 1300 to a different state. Alternatively, the coding module 1370 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and/or non-volatile and may be read-only memory (ROM), random access memory (RAM), ternary content-addressable memory (TCAM), and/or static random-access memory (SRAM).

Based on the foregoing, those skilled in the art will recognize that existing solutions mandate use of a single step size of one. In contrast, the present disclosure presents a set of available step sizes that may be selected and used. In addition, the present disclosure presents methods of deriving the step size from the precision identified in the bitstream. Therefore, the step size need not be transmitted from the encoder to the decoder.

In an embodiment, a method of coding is implemented by a decoding means. The method includes receiving a bitstream from an encoding means; parsing the bitstream to determine whether a directional prediction mode or a non-directional prediction mode is signaled; using non-directional intra prediction to generate an image when the non-directional prediction mode is signaled; parsing a distance-weighted directional intra prediction (DWDIP) flag from the bitstream when the directional prediction mode is signaled to determine whether the DWDIP flag has a first value or a second value; using distance-weighted directional intra prediction to generate the image when the DWDIP flag has the first value; using directional intra prediction to generate the image when the DWDIP flag has the second value; and displaying, on a display means of an electronic means, the image generated.

In an embodiment, a method of coding is implemented by a decoding means. The method includes receiving a bitstream from an encoding means; parsing a distance-weighted directional intra prediction (DWDIP) flag from the bitstream to determine whether the DWDIP flag has a first value or a second value; parsing only directional intra prediction modes until a directional intra prediction mode is found when the DWDIP has the first value; generating an image using distance-weighted directional intra prediction based on the directional intra prediction mode determined; parsing intra prediction modes until an intra prediction mode is found when the DWDIP has the second value; generating the image using intra prediction based on the intra prediction mode determined; and displaying, on a display means of an electronic means, the image generated.

In an embodiment, a coding means is disclosed. The coding means includes receiving means configured to receive a bitstream from an encoding means. The coding means also includes processing means coupled to the receiving means. The processing means is configured to parse a distance-weighted directional intra prediction (DWDIP) flag from the bitstream to determine whether the DWDIP flag has a first value or a second value, parse a most probable mode (MPM) list for an intra prediction mode when the DWDIP has the first value, wherein the MPM list contains only directional intra prediction modes, parse one or more remaining intra prediction modes for the intra prediction mode when the MPM list did not contain the intra prediction mode and the DWDIP has the first value, wherein any non-directional intra prediction modes within the remaining intra prediction modes are configured to be parsed last, generate an image using distance-weighted directional intra prediction based on the intra prediction mode when the DWDIP has the first value, parse one or more of the directional intra prediction modes and the non-directional intra prediction modes for the intra prediction mode when the DWDIP has the second value, and generate the image using intra prediction based on the intra prediction mode when the DWDIP has the second value. The coding means includes a display means coupled to the processing means. The display means is configured to display the image generated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of coding implemented by a decoding device, comprising:
   receiving a bitstream from an encoding device;
   parsing the bitstream to determine whether a directional prediction mode or a non-directional prediction mode is signaled;
   using non-directional intra prediction to generate an image when the non-directional prediction mode is signaled;
   parsing a distance-weighted directional intra prediction (DWDIP) flag from the bitstream when the directional prediction mode is signaled to determine whether the DWDIP flag has a first value or a second value;
   using distance-weighted directional intra prediction to generate the image when the DWDIP flag has the first value;
   using directional intra prediction to generate the image when the DWDIP flag has the second value; and
   displaying, on a display of an electronic device, the image generated.

2. The method of claim 1, wherein the non-directional intra prediction comprises direct current (DC) intra prediction or planar intra prediction.

3. The method of claim 1, wherein the DWDIP flag is parsed only after the bitstream is parsed to determine whether the directional prediction mode or the non-directional prediction mode is signaled.

4. The method of claim 1, wherein the first value is 1 to indicate that a DWDIP mode is set to ON.

5. The method of claim 1, wherein the first value is 0 to indicate a DWDIP mode is set to OFF.

6. The method of claim 1, wherein the DWDIP flag is a dwdip_enable_flag.

7. The method of claim 6, wherein the dwdip_enable_flag being set to 1 indicates that a DWDIP mode is enabled for a luma component in a current coding unit.

8. The method of claim 6, wherein the dwdip_enable_flag being set to 0 indicates that a DWDIP mode is disabled for a luma component in a current coding unit.

9. A method of coding implemented by a decoding device, comprising:
receiving a bitstream from an encoding device;
parsing a distance-weighted directional intra prediction (DWDIP) flag from the bitstream to determine whether the DWDIP flag has a first value or a second value;
parsing only directional intra prediction modes until a directional intra prediction mode is found when the DWDIP flag has the first value;
generating an image using distance-weighted directional intra prediction based on the directional intra prediction mode determined;
parsing intra prediction modes until an intra prediction mode is found when the DWDIP flag has the second value;
generating the image using intra prediction based on the intra prediction mode determined; and
displaying, on a display of an electronic device, the image generated.

10. The method of claim 9, wherein parsing only the directional intra prediction modes comprises:
parsing a most probable mode (MPM) list; and
parsing remaining directional intra prediction modes when the MPM list does not contain the directional intra prediction mode that was determined.

11. The method of claim 9, wherein the intra prediction modes include both directional and non-directional intra prediction modes.

12. The method of claim 9, wherein the first value is 1 to indicate that a DWDIP mode is set to ON, and the first value is 0 to indicate the DWDIP mode is set to OFF.

13. The method of claim 9, wherein the DWDIP flag is a dwdip_enable_flag.

14. The method of claim 13, wherein the dwdip_enable_flag being set to 1 indicates that a DWDIP mode is enabled for a luma component in a current coding unit.

15. The method of claim 13, wherein the dwdip_enable_flag being set to 0 indicates that a DWDIP mode is disabled for a luma component in a current coding unit.

16. A coding device, comprising:
a receiver configured to receive a bitstream from an encoding device;
a processor coupled to the receiver, the processor configured to:
parse a distance-weighted directional intra prediction (DWDIP) flag from the bitstream to determine whether the DWDIP flag has a first value or a second value;
parse a most probable mode (MPM) list for an intra prediction mode when the DWDIP flag has the first value, wherein the MPM list contains only directional intra prediction modes;
parse one or more remaining intra prediction modes for the intra prediction mode when the MPM list did not contain the intra prediction mode and the DWDIP flag has the first value, wherein any non-directional intra prediction modes within the remaining intra prediction modes are configured to be parsed last;
generate an image using distance-weighted directional intra prediction based on the intra prediction mode when the DWDIP flag has the first value;
parse one or more of the directional intra prediction modes and the non-directional intra prediction modes for the intra prediction mode when the DWDIP flag has the second value; and
generate the image using intra prediction based on the intra prediction mode when the DWDIP flag has the second value; and
a display coupled to the processor, the display configured to display the image generated.

17. The coding device of claim 16, wherein the non-directional intra prediction modes comprise a direct current (DC) intra prediction mode and a planar intra prediction mode.

18. The coding device of claim 16, wherein the DWDIP flag is a dwdip_enable_flag.

19. The coding device of claim 18, wherein the dwdip_enable_flag being set to 1 indicates that a DWDIP mode is enabled for a luma component in a current coding unit.

20. The coding device of claim 18, wherein the dwdip_enable_flag being set to 0 indicates that a DWDIP mode is disabled for a luma component in a current coding unit.

* * * * *